United States Patent
Michel

(10) Patent No.: US 8,172,045 B2
(45) Date of Patent: May 8, 2012

(54) REMOTE HAND BRAKE

(75) Inventor: Mark Michel, Greer, SC (US)

(73) Assignee: Ellcon National, Inc., Greenville, SC (US)

( * ) Notice: Subject to any disclaimer, the term of this patent is extended or adjusted under 35 U.S.C. 154(b) by 78 days.

(21) Appl. No.: 12/470,217

(22) Filed: May 21, 2009

(65) Prior Publication Data

US 2010/0062900 A1    Mar. 11, 2010

Related U.S. Application Data

(60) Provisional application No. 61/096,046, filed on Sep. 11, 2008.

(51) Int. Cl.
*F16D 65/14*    (2006.01)
(52) U.S. Cl. .......................... 188/33; 188/107
(58) Field of Classification Search .................. 188/3 R, 188/33, 34, 107; 303/2, 20
See application file for complete search history.

(56) References Cited

U.S. PATENT DOCUMENTS

| | | | |
|---|---|---|---|
| 5,469,941 A * | 11/1995 | Horvath | 188/107 |
| 5,701,974 A | 12/1997 | Kanjo et al. | |
| 6,170,619 B1 | 1/2001 | Sheriff et al. | |
| 6,237,722 B1 | 5/2001 | Hammond et al. | |
| 6,364,069 B1 | 4/2002 | Ring | |
| 6,474,451 B1 | 11/2002 | O'Brien, Jr. | |
| 6,913,325 B2 * | 7/2005 | Michel et al. | 303/2 |
| 7,140,477 B2 * | 11/2006 | Engle et al. | 188/265 |
| 7,156,471 B2 * | 1/2007 | Sommerfeld | 303/2 |
| 7,607,521 B2 | 10/2009 | Ginder | |
| 7,757,825 B2 * | 7/2010 | Michel | 188/107 |
| 2002/0017439 A1 | 2/2002 | Hill et al. | |
| 2003/0058091 A1 | 3/2003 | Petersen et al. | |
| 2004/0050629 A1 * | 3/2004 | Herron | 188/3 R |
| 2005/0279184 A1 * | 12/2005 | Sommerfeld et al. | 74/552 |
| 2006/0097566 A1 * | 5/2006 | Sommerfeld | 303/15 |

(Continued)

FOREIGN PATENT DOCUMENTS

EP    1193155    4/2002

OTHER PUBLICATIONS

Office Action, dated Nov. 12, 2010, from Canadian Application No. 2667680.

(Continued)

*Primary Examiner* — Christopher Schwartz
(74) *Attorney, Agent, or Firm* — Nelson Mullins Riley & Scarborough, LLP

(57) ABSTRACT

A quick release brake mechanism has a housing, a first shaft mounted in the housing and at least one gear rotatably received thereon. A second gear is rotatably mounted in the housing in operative engagement with the first shaft. A clutch is operatively disposed between the first shaft and the second gear, and a locking mechanism is mounted in the housing in operative engagement with the first shaft at least one gear and the clutch. The clutch is moveable between a first position in which the first shaft is rotationally coupled to the first and the second gears, and a second position in which the second gear rotates with respect to the first shaft. A remotely operated quick release mechanism operatively coupled to the housing has a first end operatively coupled to a power source and an opposite second end operatively coupled to the clutch so as to move the clutch from the clutch first position into the clutch second position.

18 Claims, 15 Drawing Sheets

U.S. PATENT DOCUMENTS

| | | | |
|---|---|---|---|
| 2007/0056814 A1* | 3/2007 | Michel et al. | 188/196 B |
| 2007/0151812 A1* | 7/2007 | Michel et al. | 188/33 |
| 2008/0110702 A1 | 5/2008 | Sommerfeld et al. | |
| 2010/0059320 A1* | 3/2010 | Michel et al. | 188/1.11 E |
| 2010/0059327 A1* | 3/2010 | Michel | 192/13 A |

OTHER PUBLICATIONS

Response dated May 12, 2011 to Office Action dated Nov. 12, 2010 for co-pending Canadian Patent Application No. 2,667,680.

Canadian Office Action dated Jul. 4, 2011 for co-pending Canadian Patent Application No. 2,666,818.

Response dated Oct. 18, 2011 to Office Action dated Jul. 4, 2011 for co-pending Canadian Patent Application No. 2,666,818.

Canadian Office Action dated Sep. 29, 2011 for co-pending Canadian Patent Application No. 2,667,680.

Office Action dated Nov. 29, 2011 for co-pending U.S. Appl. No. 12/470,979.

* cited by examiner

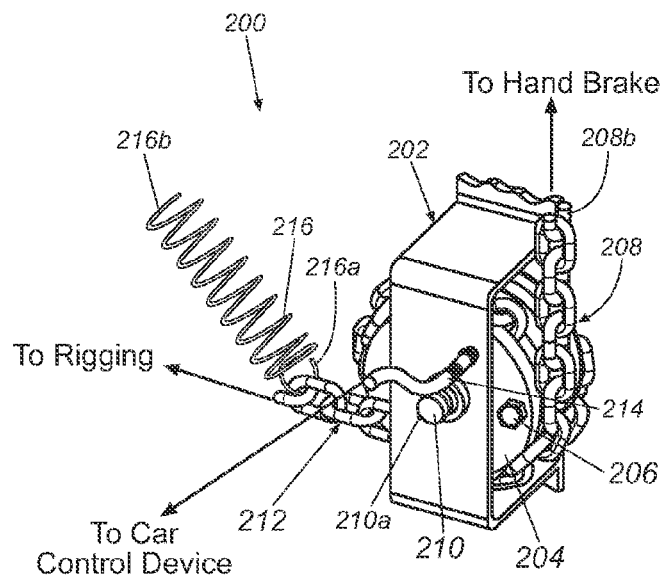
Fig. 14
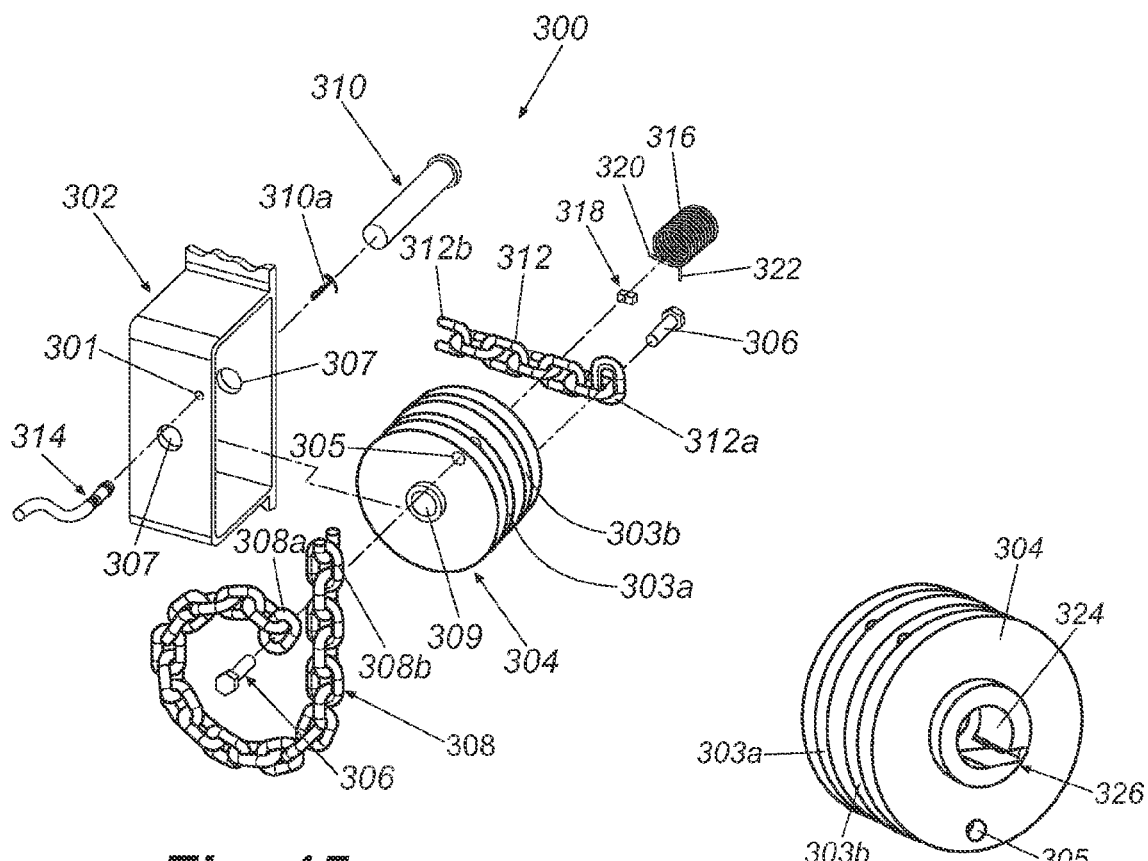
Fig. 15
Fig. 16

REMOTE HAND BRAKE

CLAIM OF PRIORITY

The present application claims priority to U.S. Provisional Patent Application Ser. No. 61/096,046, filed Sep. 11, 2008, entitled Remote Hand Brake, Power Sheave and Chain Locator, the entire disclosure of which is incorporated by reference herein.

FIELD OF THE INVENTION

The present invention relates generally to railcar brake systems. More particularly, the present invention relates to a manual/automated quick release brake, a pulley system for use with the handbrake and a chain locator for use alone or in combination with said pulley system with said hand brake.

BACKGROUND

Wheel damage contributes a great deal to maintenance costs associated with railway freight cars. Unreleased handbrakes contribute to most damage on freight car wheels. That is, if the handbrake is left in the applied position and an engine then pulls the railway car, the wheel will not rotate thereby causing flat spots to form on the area of the wheel in contact with the rail.

It is well known in the art of railroad cars to equip railcars with a manual brake system that is actuated by a manually turned wheel. The wheel is attached through gearing to an axle by a chain running down the front of the car, the other end of the chain being connected to the brake rigging. Turning of the wheel gathers the chain, putting it in tension, thereby causing the brake pads to contact the wheel. Prior art systems also use quick release handbrakes to release the brakes. However, one problem with these systems is that it is difficult to detect if the brake system is actually fully released.

One way to ensure that a brake system is released is to detect when the brake is in the fully released position. Several methods have been suggested for sensing when a freight car hand brake is fully released such as those systems described in U.S. Pat. Nos. 6,170,619, 6,237,722 and 6,364,069. However, these solutions present additional problems and fail to provide an automated brake release solution.

SUMMARY OF THE INVENTION

The present invention recognizes and addresses disadvantages of prior art constructions and methods, and it is an object of the present invention to provide an improved remote handbrake. This and other objects may be achieved by a brake mechanism for connecting to the brake rigging of a railway car comprising a housing, a first handle, a first shaft mounted in the housing and coupled to the first handle, the first shaft having at least one gear rotatably received thereon and a second gear rotatably mounted in the housing in operative engagement with the first shaft. A locking mechanism is mounted in the housing and is in operative engagement with the first shaft at least one gear, the locking mechanism comprises a second shaft mounted in the housing, a first pawl rotatably received on the second shaft and in operative engagement with the first shaft at least one gear, and a second pawl having a first portion and a second portion, the first portion being in operative engagement with the first pawl. A clutch is operatively disposed between the first handle and the second gear, the clutch being in operative engagement with the second pawl second portion, wherein the clutch is moveable between a first position in which the first shaft is rotationally coupled to the first and the second gears, and a second position in which the second gear rotates with respect to the first shaft. A remotely operated quick release mechanism is operatively coupled to the housing, the remotely operated quick release mechanism has a first end operatively coupled to a power source and an opposite second end operatively coupled to the clutch so as to move the clutch from the clutch first position into the clutch second position.

In some embodiments, a bell crank is mounted in the housing intermediate the clutch and the remotely operated quick release mechanism. In this configuration, when the remotely operated quick release mechanism is actuated, the bell crank is engaged with the clutch to move the clutch to the second position, and the second pawl second portion releasably retains the clutch in the second position. In these embodiments, the quick release mechanism further comprises an air cylinder having an input port and a moveable rod, wherein, the input port is coupled to the power source, and the moveable rod is operatively coupled to the clutch by the bell crank. In other embodiments, a lever may be operatively coupled between the remote operated quick release mechanism second end and the bell crank.

In yet other embodiments, the power supply is a source of compressed air. In other embodiments, an air solenoid control valve is positioned intermediate the compressed air source and the air cylinder for controlling the flow of air into the air cylinder.

In other embodiments, the clutch further comprises a driver, at least one clutch plate disposed between the driver and the first shaft at least one gear, a pinion gear axially fixed and rotatably received on the first shaft, a coupler positioned intermediate the pinion gear and the driver, the coupler being rotationally fixed and axially moveable with respect to the driver, the coupler rotationally fixing the pinion gear to the driver in the clutch first position and disengaging the pinion gear from the first shaft in the clutch second position; and a spring disposed between the coupler and the driver to bias the coupler into engagement with the pinion gear.

In alternate embodiments, the pinion gear comprises a plurality of drive dogs located proximate the coupler, and the coupler defines a plurality of openings spaced about the coupler, wherein a respective one of the plurality of drive dog engages a corresponding one of the plurality of openings to rotationally couple the pinion gear to the coupler.

In some embodiments, a chain is coupled between the second gear and the railway car brake rigging.

In another preferred embodiments, a quick release brake mechanism for use on a railway car comprises a housing, a first shaft mounted in the housing and at least one gear rotatably received thereon, and a second gear rotatably mounted in the housing in operative engagement with the first shaft. A clutch is operatively disposed between the first shaft and the second gear, and a locking mechanism is mounted in the housing in operative engagement with the first shaft at least one gear and the clutch. The clutch is moveable between a first position in which the first shaft is rotationally coupled to the first and the second gears, and a second position in which the second gear rotates with respect to the first shaft. A remotely operated quick release mechanism is operatively coupled to the housing, the remotely operated quick release mechanism has a first end operatively coupled to a power source and an opposite second end operatively coupled to the clutch so as to move the clutch from the clutch first position into the clutch second position.

In some embodiments, the locking mechanism comprises a second shaft mounted in the housing, a first pawl rotatably received on the second shaft and in operative engagement with the first shaft at least one gear, and a second pawl having a first portion and a second portion, the first portion being in operative engagement with the first pawl and the second portion being in operative engagement with the clutch.

In other embodiments, the quick release mechanism further comprises an air cylinder having an input port and a moveable rod, wherein, the input port is coupled to the power source, and the moveable rod is operatively coupled to the clutch.

In yet other embodiments, a lever is operatively coupled between the remote operated quick release mechanism second end and the clutch.

In some embodiments, the power supply is a source of compressed air. In yet other embodiments, an air solenoid control valve is positioned intermediate the compressed air source and the air cylinder for controlling the flow of air into the air cylinder.

In operation, a method for releasing a railway brake remotely from the railway car comprises the steps of providing a brake mechanism for connecting to the brake rigging of a railway car comprising a housing, a first shaft mounted in the housing and having at least one gear rotatably received thereon, a second gear rotatably mounted in the housing in operative engagement with the first shaft, a clutch operatively disposed between the first shaft and the second gear, a locking mechanism mounted in the housing and in operative engagement with the first shaft at least one gear and the clutch, wherein the clutch is moveable between a first position in which the first shaft is rotationally coupled to the first and the second gears, and a second position in which the second gear rotates with respect to the first shaft. A remotely operated quick release mechanism has a first end operatively coupled to a compressed air source and an opposite second end operatively coupled to the clutch. The method further comprises the step of actuating the quick release mechanism from a remote location so that the clutch is moved from the first position into the second position.

In other embodiments, the method further comprises the step of maintaining the clutch in the second position using the locking mechanism. In other embodiments, the remote operated quick release mechanism further comprises an air cylinder having a moveable rod, wherein the moveable rod is operatively coupled to the clutch and the air cylinder is operatively coupled to the housing.

In yet other embodiments, the locking mechanism comprises a second shaft mounted in the housing, a first pawl rotatably received on the second shaft and in operative engagement with the first shaft at least one gear, and a second pawl having a first portion and a second portion, the first portion being in operative engagement with the first pawl and the second portion being in operative engagement with the clutch.

In other embodiments, a lever is operatively coupled between the remote operated quick release mechanism second end and the clutch.

Various combinations and sub-combinations of the disclosed elements, as well as methods of utilizing same, which are discussed in detail below, provide other objects, features and aspects of the present invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 14 is a perspective view of the pulley system of FIG. 12 with the hand brake in the fully applied position;

FIG. 15 is an exploded view of an embodiment of a pulley system for use in a freight car brake system;

FIG. 16 is a perspective view of a drum for use in the pulley system of FIG. 15;

Figure 1:
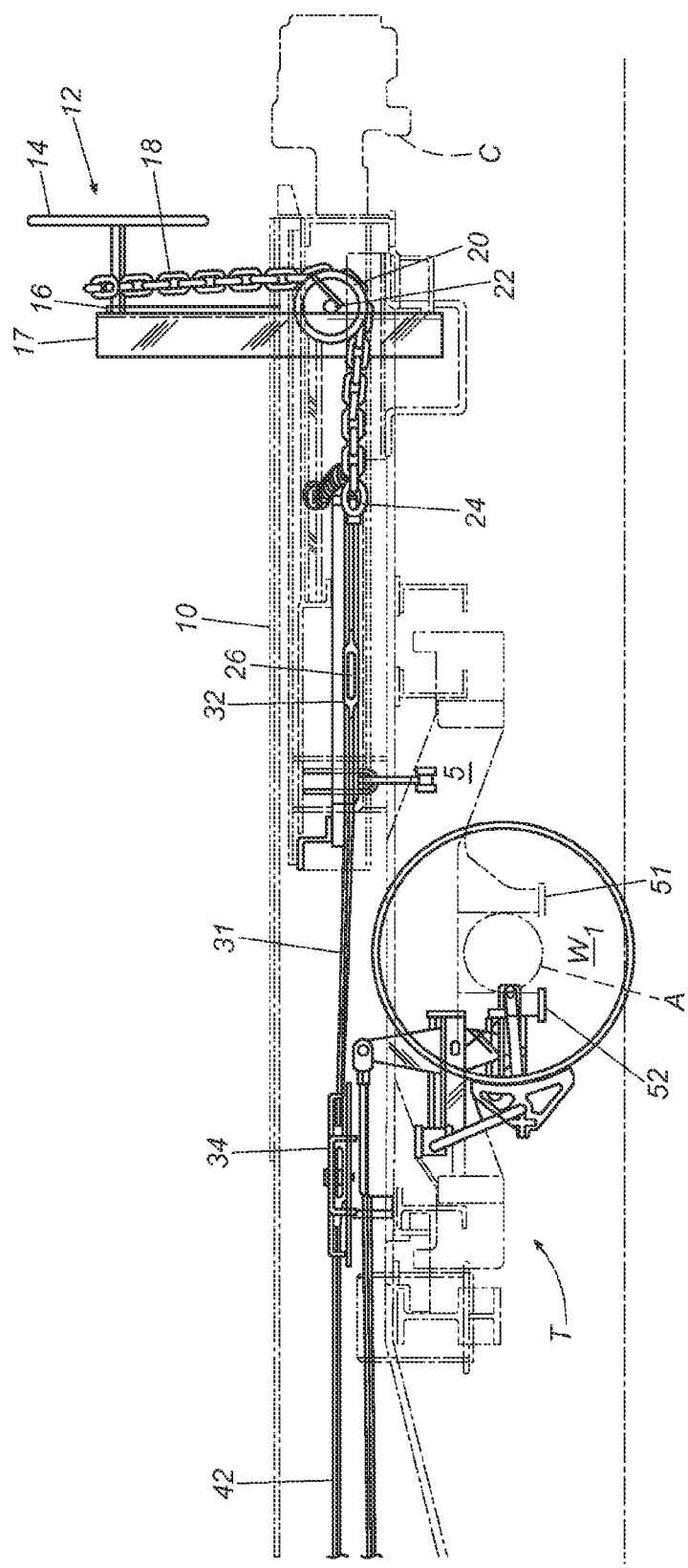
FIG. 1 is a side elevation view of a prior art railway car having a handbrake connected to a truck brake via a chain.

Repeat use of reference characters in the present specification and drawings is intended to represent same or analogous features or elements of the invention according to the disclosure.

DETAILED DESCRIPTION OF THE PREFERRED EMBODIMENT

Reference will now be made in detail to presently preferred embodiments of the invention, one or more examples of which are illustrated in the accompanying drawings. Each example is provided by way of explanation, not limitation, of the invention. It is to be understood by one of ordinary skill in the art that the present discussion is a description of exemplary embodiments only, and is not intended as limiting the broader aspects of the present invention, which broader aspects are embodied in the exemplary constructions. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a prior art hand brake 12 is shown mounted on a railway car 10. Railway car 10 is supported by a pair of single axle trucks "T" having respective wheels "W." Car 10 may be connected to an adjacent car (not shown) by means of a conventional coupler "C." A single axle suspension system includes a longitudinally extending side frame "S" having depending portions S1 and S2, which receive a transverse axle "A". Hand brake 12 includes a hand brake wheel 14 rotatably mounted on a vertically extending hand brake plate 16 supported by angles 17 in a conventional manner. It should be understood that any type of handbrake may be used, and handbrake 12 is being shown for illustrative purposes. Hand brake wheel 14 coupled with a chain 18 that extends around a pulley 20 rotatably mounted on a suitable pin 22. Chain 18 is connected at one end 24 to a horizontally extending hand brake lever 26. A brake rod 31 is connected to a mid-portion 32 of lever 26. Brake rod 31, at one end 34, is connected to another horizontally extending brake lever 42.

It should be understood by those of skill in the art that the above described handbrake arrangement and railway car are presented for illustrative purposes only and do not limit the scope, breadth and use of the present invention. For example, the present invention may be used on any type of railway car in any combination of the various embodiments described herein.

Figure 2:
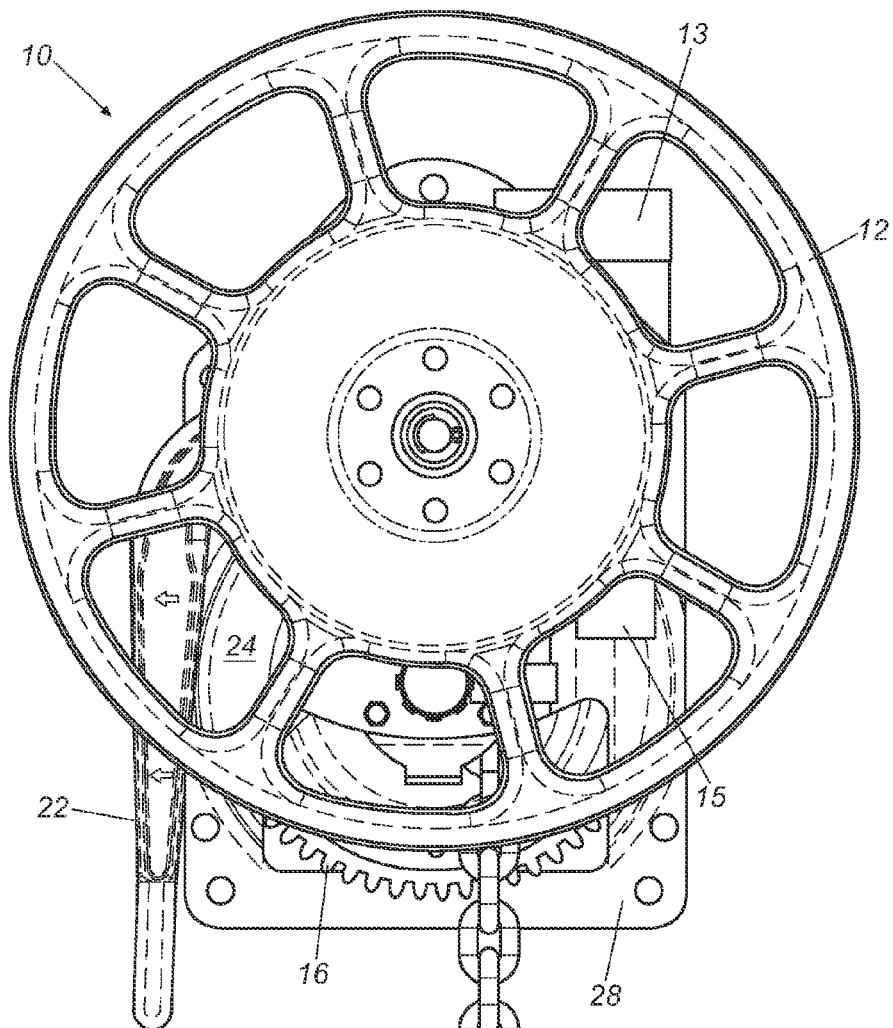
FIG. 2 is a front plan view of an embodiment of a manual/automated hand brake for use in a freight car brake system.
Figure 3:
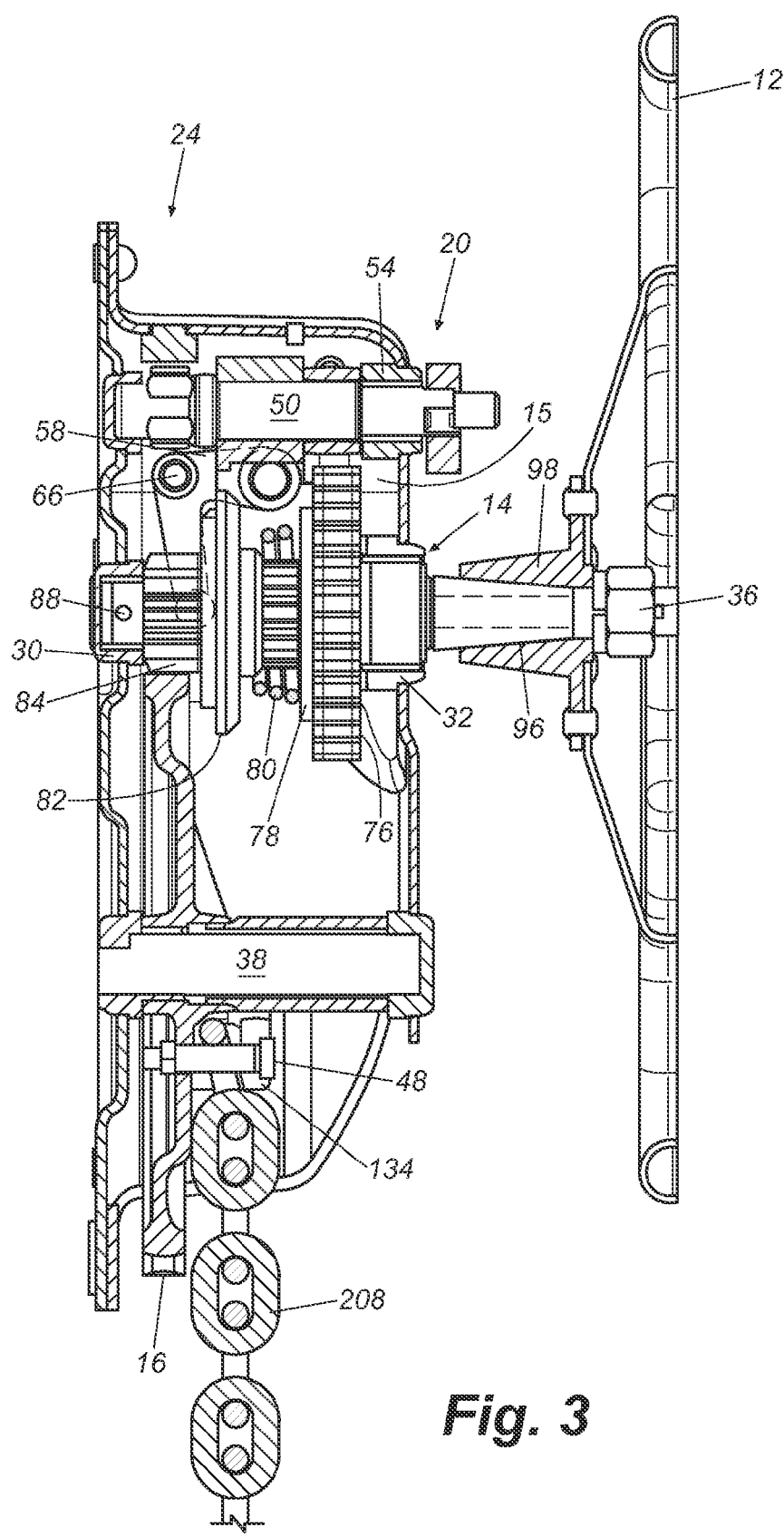
FIG. 3 is a side view, in partial cutaway, of the hand brake of FIG. 2.
Figure 4:
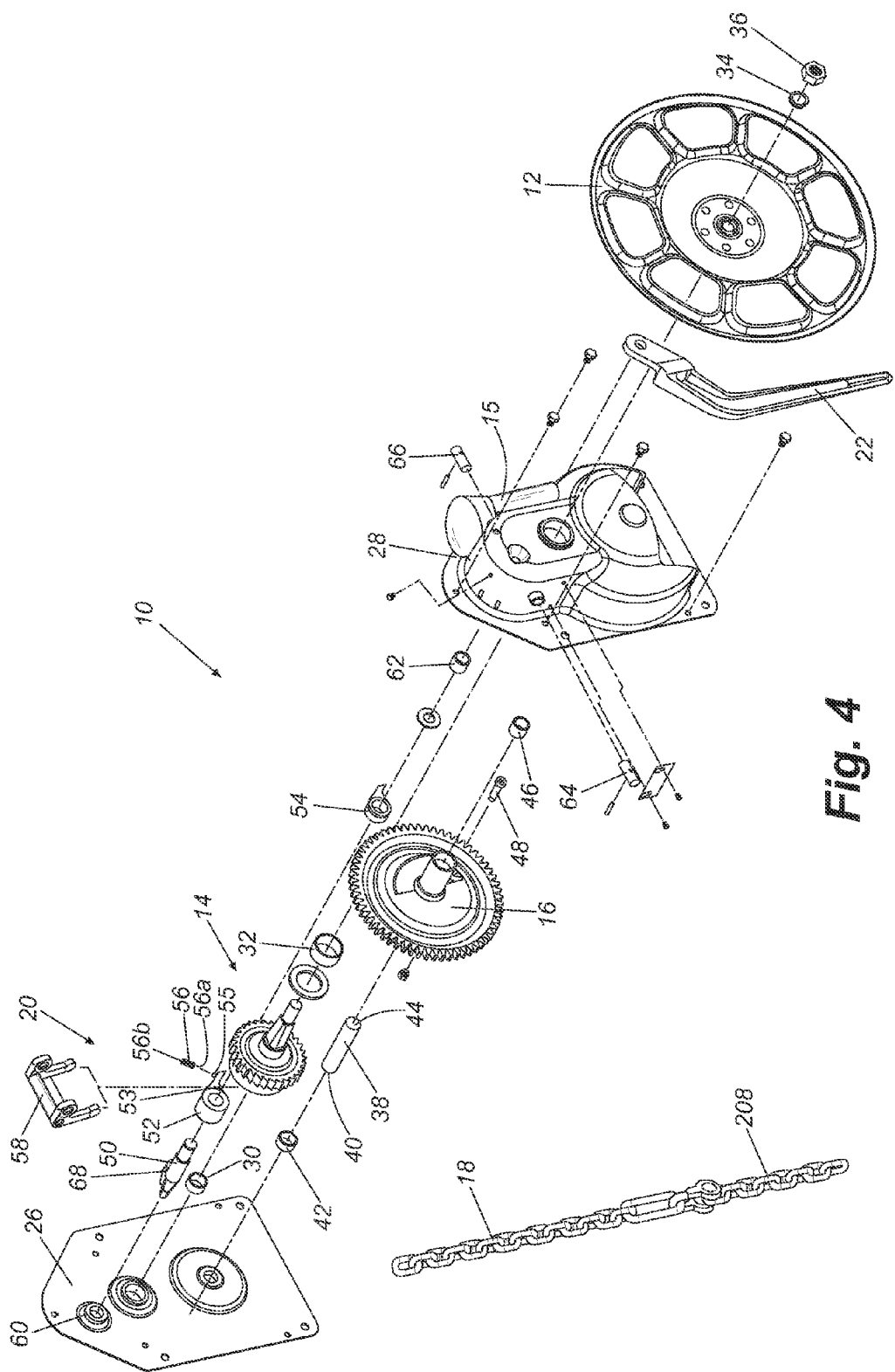
FIG. 4 is an exploded perspective view of the hand brake of FIG. 2.

Referring to FIGS. 2, 3 and 4, a manual/automated hand brake 10 for use in the present invention is shown having a handle 12, a geared shaft generally designated 14, a gear 16, a chain 208, which may be similar to chain 18 from FIG. 1, a locking mechanism generally denoted 20, a release handle 22, an automated quick release mechanism 13 having an air input port 15 and a housing 24.

Referring particularly to FIG. 4, housing 24 contains a back plate 26 and a cover plate 28. A first end of geared shaft 14 is received by back plate 26 in a bearing 30 and a second end is received by cover plate 28 by a bearing 32. Handle 12 is a round wheel that is rotationally fixed on geared shaft second end 90 and secured thereon by a washer 34 and nut 36. Gear 16 is rotationally fixed on a shaft 38 that has a first end 40 received by back plate 26 in a bearing 42 and a second end 44 received by cover plate 28 in a bearing 46. Chain 208 is secured to gear 16 by a fastener 48.

Figure 8A:
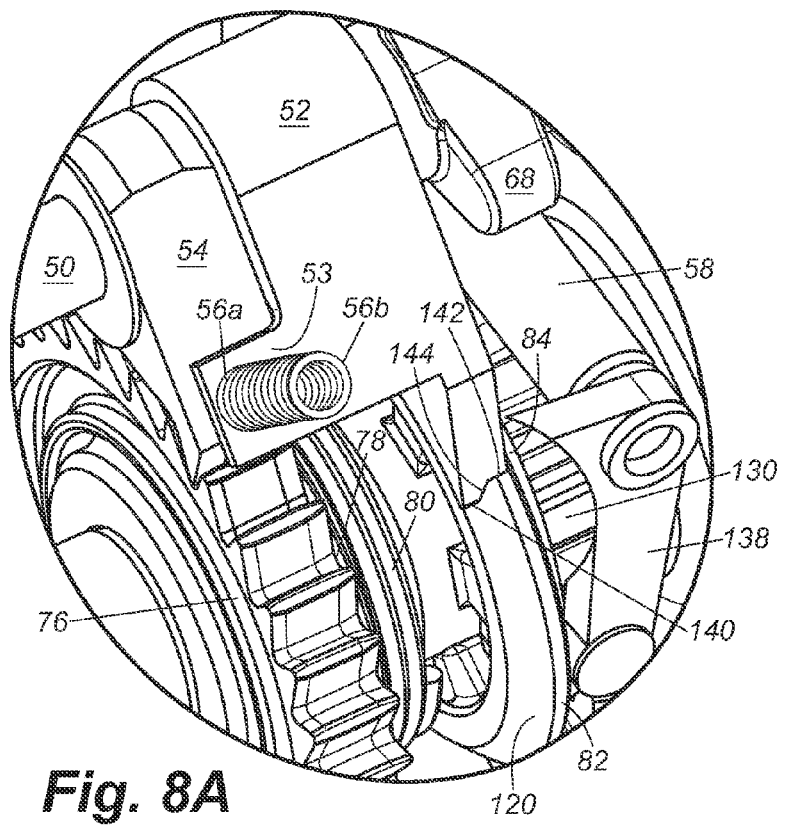
FIGS. 8A and 8B are partial perspective views of the sustained release mechanism used in the hand brake of FIG. 1.

Locking mechanism 20 includes a shaft 50, a sustained release pawl 52, a locking pawl 54, a spring 56, and a bell crank 58. A first end of shaft 50 is received by back plate 26 in a bearing 60 and a second end of the shaft is received by cover plate 28 in a bearing 62. Quick release handle 22 is rotationally fixed to the second end of shaft 50. Bell crank 58 is rotatably secured on pins 64 and 66 perpendicularly with respect to shaft 50. Referring to FIGS. 4 and 8A, a cam 68 formed on shaft 50 is operatively coupled to bell crank 58 so that rotation of shaft 50 causes cam 68 to engage bell crank 58, as further described herein. Sustained release pawl 52 and locking pawl 54 are rotatably received on shaft 50 and are positioned such that a portion 53 of sustained release pawl 52 extends over pawl 54. One end 56a of spring 56 is coupled to a pin 55 (FIG. 4) and the other end 56b is coupled to the inside of front plate 28. The spring functions to bias both the sustained release pawl and the locking pawl about shaft 50 such that the locking pawl engages the teeth on a ratchet wheel 76.

Figure 5:
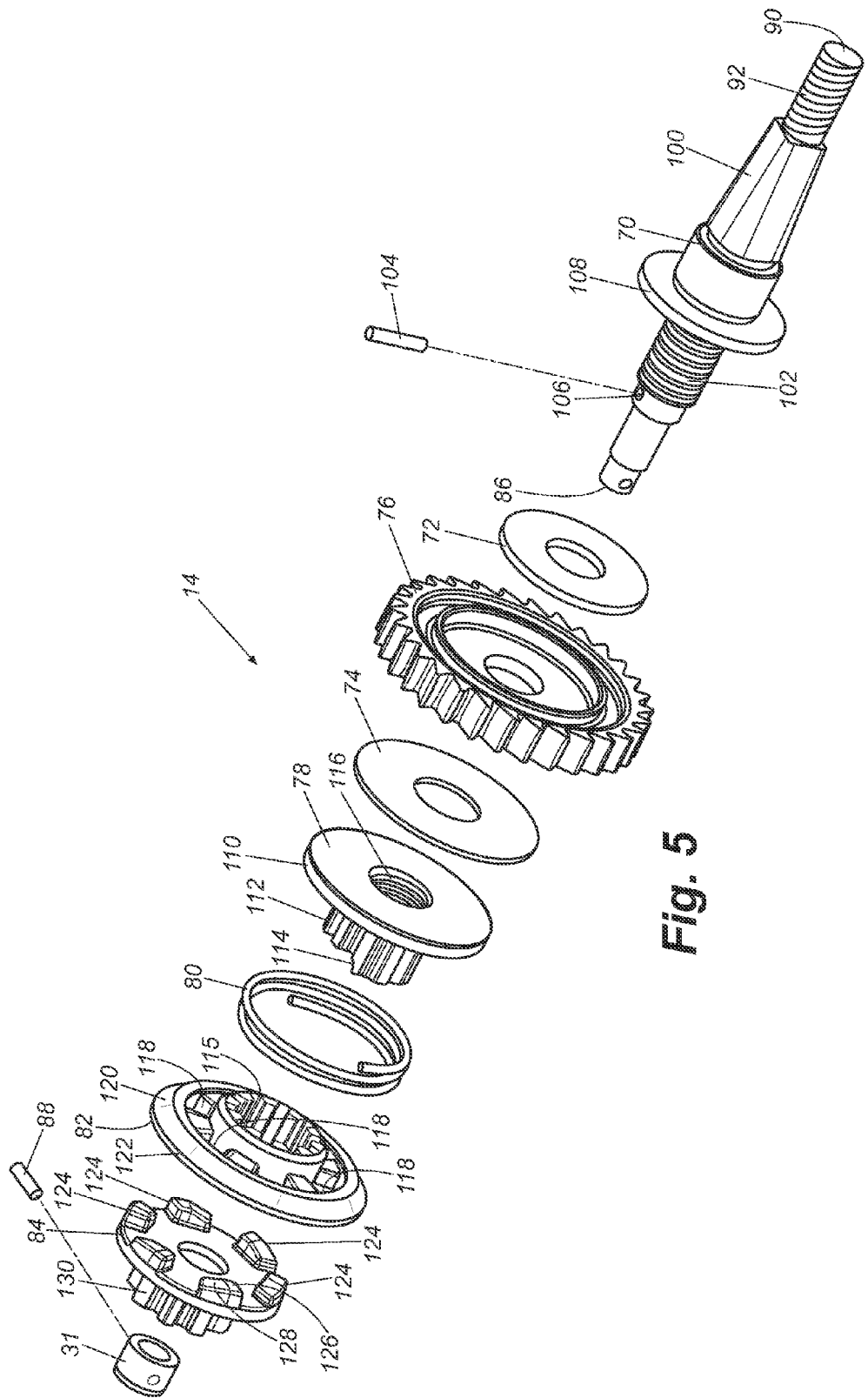
FIG. 5 is an exploded perspective view of the hand brake gear shaft and gear mechanism of FIG. 2.
Figure 6:
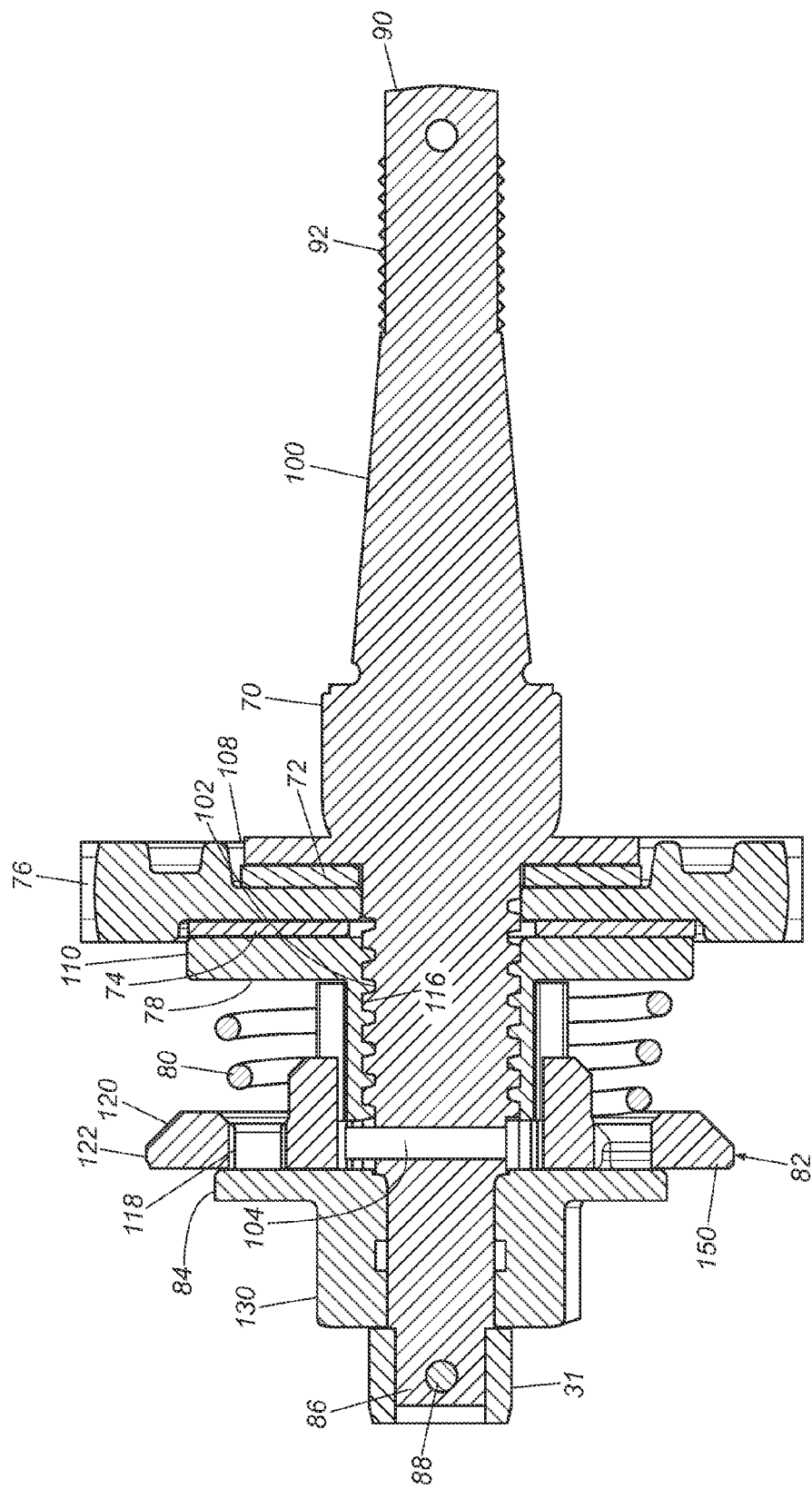
FIG. 6 is a side cutaway view of the hand brake gear shaft and gear mechanism of FIG. 5.

Referring to FIG. 5, geared shaft 14 includes a shaft 70, clutch plates 72 and 74, ratchet wheel 76, a driver 78, a spring 80, a coupler 82 and a pinion 84. A first end 86 of shaft 70 is generally cylindrical and is received via collar 31 in bearing 30. A pin 88 secures collar 31 to shaft first end 86. A second end 90 of shaft 70 is also generally cylindrical and includes threads 92 that receive nut 36 (FIG. 3) to secure wheel 12 to shaft 70. Wheel 12 includes a polygonally shaped bore 96 (FIG. 3) formed in a hub 98 that receives a polygonally shaped portion 100 of shaft 70. Intermediate polygonally shaped shaft portion 100 and shaft first end 86 is a threaded shaft portion 102. A pin 104 is received in a blind bore 106 that acts as a stop as described in greater detail herein. A radial extending flange 108 is coupled to shaft 70 intermediate polygonal portion 100 and threaded portion 102. Flange 108 can be formed apart from shaft 70 and rotationally fixed to the shaft or it may be integrally formed on the shaft.

Clutch plate 72 is rotatably received on shaft 70 intermediate flange 108 and ratchet wheel 76. Ratchet wheel 76, like clutch plate 72, is rotatably received on shaft 70. Clutch plate 74 is rotatably received on shaft 70 intermediate ratchet wheel 76 and driver 78. Driver 78 has a radially extending flange 110, a generally cylindrical splined portion 112 and a stop wall 114. An axially threaded bore 116 formed through driver 78 interengages with shaft threaded portion 102, as described in further detail below. Spring 80 is rotatably received on shaft 70 intermediate driver 78 and coupler 82. Coupler 82 is generally cylindrical in shape and includes a splined bore 115, angularly spaced openings 118 and a beveled surface 120, which formed adjacent an outer circumference 122. Coupler 82 is rotationally fixed to driver 78 through splines 112 and splined bore 115 but, it is axially moveable with respect to driver 78. Pinion 84 is rotatably received adjacent coupler 82, rotationally fixed to coupler 82 via a plurality of drive dogs 124 and coupler 82 is axially moveable with respect to pinion 84. Each drive dog 124 includes a flat top portion 126 and an angled portion 128. Pinion 84 includes a gear 130 that interengages with gear 16 (FIG. 3).

Referring once again to FIG. 3, one end of chain 208 is rotatably coupled to gear 16 by fastener 48 that is received in a clevis 134, which is preferably formed integral with gear 16. Fastener 48 could be any suitable fastener and in one embodiment is a bolt and nut. The distal end of chain 208 is secured to the brake rigging on a vehicle, such as a railway car, in a conventional manner so that when chain 208 is wound about gear shaft 38 the brakes of the vehicle are applied to stop or prevent movement of the vehicle.

Prior to describing the operation of the sustained brake release mechanism, a description of the general operation of the brake mechanism is presented. Beginning with the brake mechanism in the released position (FIG. 8A) with quick release handle 22 positioned so that cam 68 is disengaged from bell crank 58, coupler 82 is biased toward pinion drive dogs 124 through spring 80 so that the drive dogs engage coupler openings 118. The drive dogs and openings rotationally fix the pinion to the coupler so that they rotate in unison. Because pinion gear 130 is interengaged with gear 16, chain 208 exerts a downward force to hold gear 16 in a rotationally fixed position.

Assuming that driver 78 is positioned so that clutch plates 72 and 74 do not rotationally lock the driver to ratchet wheel 76, then movement of wheel 12 in a clockwise direction (as viewed in FIG. 2) will cause shaft 70 to rotate with respect to driver 78 because of the counterforce exerted by gear 16 on coupler 82 through pinion gear 130. Thus, driver threads 116 interengage with shaft threads 102 so that the driver moves axially to the right, (with respect to FIG. 3). It should be understood that as driver 78 moves axially to the right along shaft threads 102, the driver will remain rotationally locked to coupler 82 through the interaction of coupler splines 115 and driver splines 112. Thus continued clockwise rotation of wheel 12 will cause driver 78 to move further to the right until the driver pins clutch plates 72 and 74 between driver 78, ratchet wheel 76 and shaft flange 108. At this point, the ratchet wheel 76, shaft 70, driver 78, coupler 82 and pinion 84 are all rotatably fixed with respect to each other. Thus, continued application of rotational force in a clockwise direction on wheel 12 will cause gear ratchet wheel 16 to rotate so as to apply the brakes on the vehicle. Once the desired amount of force has been applied on chain 208 to properly engage the vehicle brake, pawl 54, which always remains in positive engagement with ratchet wheel 76, prevents the ratchet wheel from rotating in the opposite direction to unnecessarily release the brakes.

Figure 9:
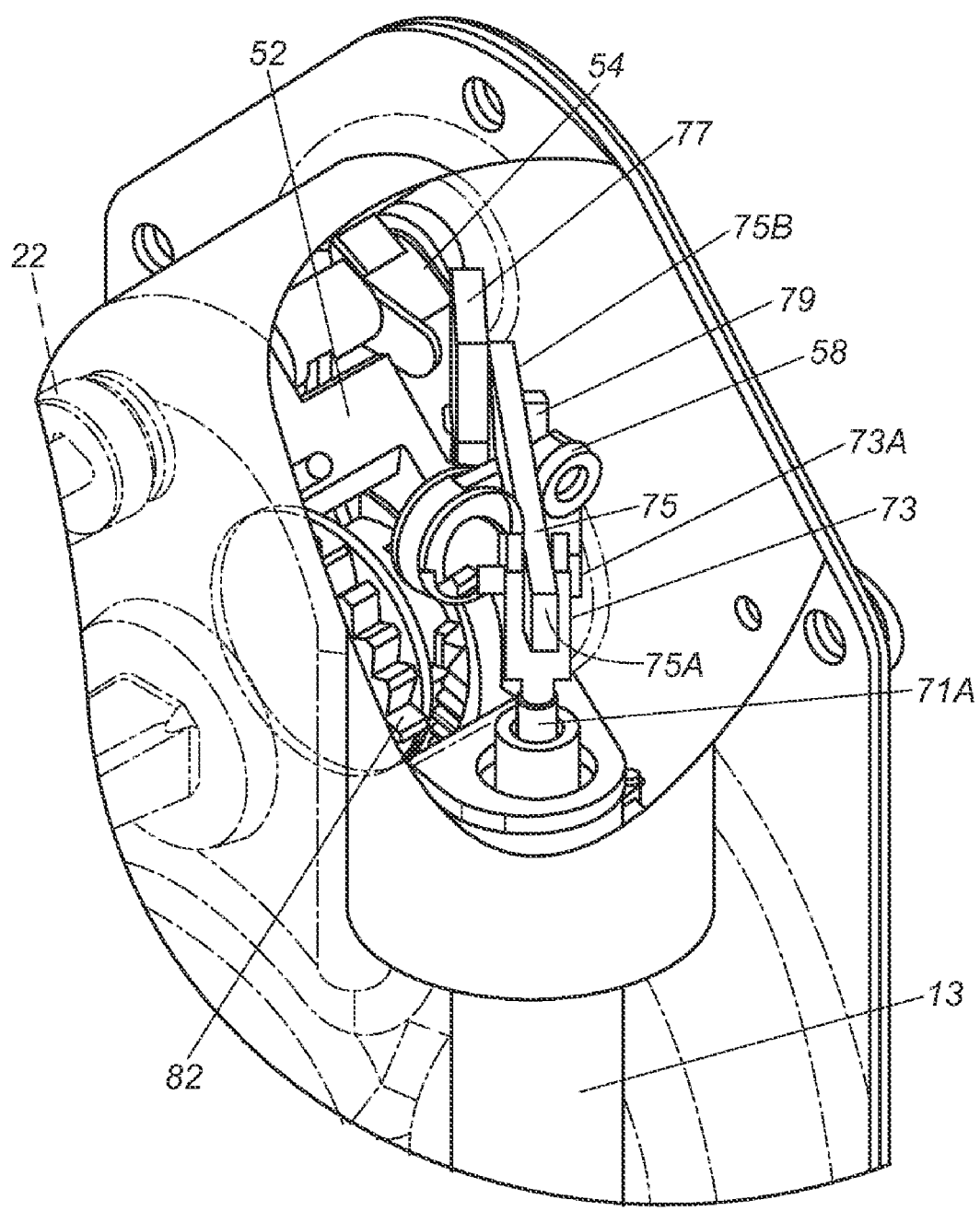
FIG. 9 is a partial perspective view of an automatic release mechanism for use with the hand brake of FIG. 2.
Figure 10:
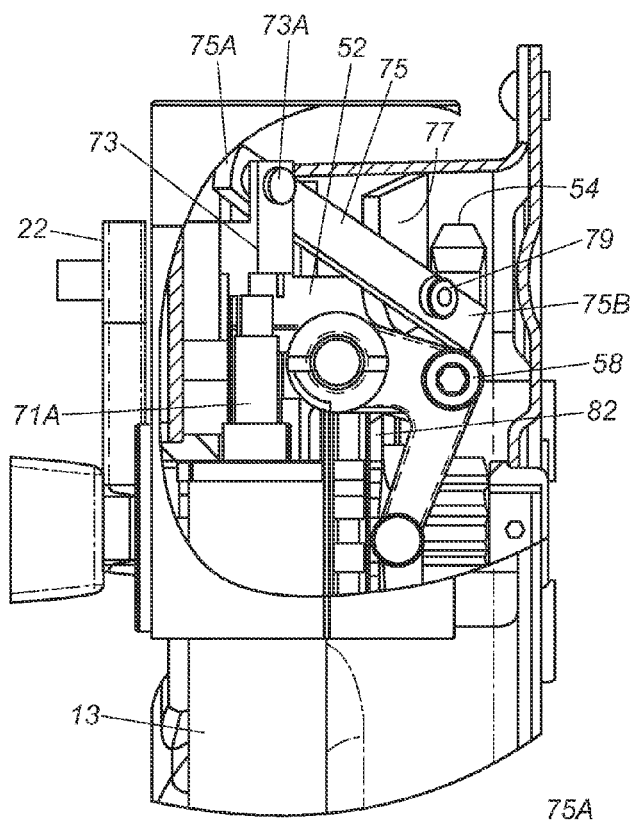
FIG. 10 is a partial side view of the automatic release mechanism of FIG. 9, shown in the released position.
Figure 11:
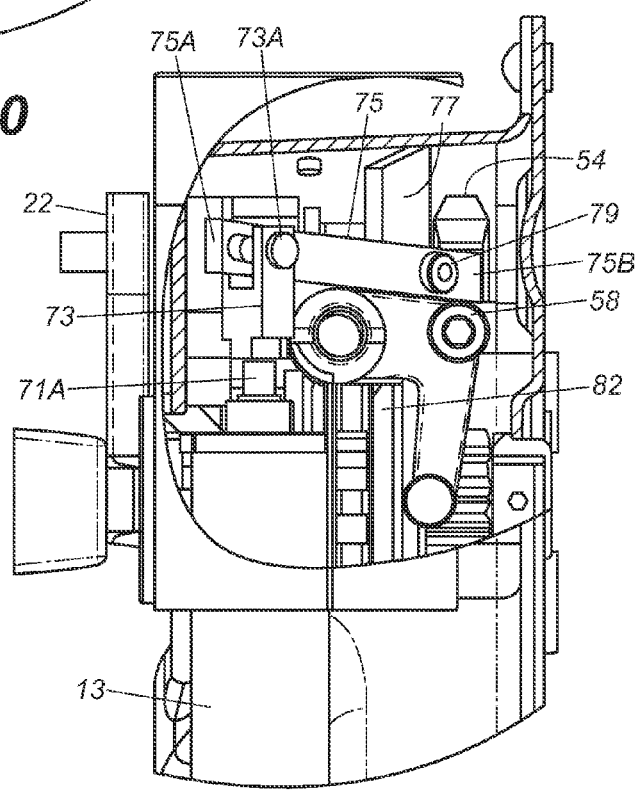
FIG. 11 is a partial side view of the automatic release mechanism of FIG. 9, shown in the operating position.

The brake can be released in one of three ways: by rotating wheel 12 in the counterclockwise direction, by rotating quick release handle 22 upward (with respect to FIG. 2) to disengage the coupler from the pinion, or by actuating automated release mechanism 13 (FIGS. 9-11). To release the brake by the operation of wheel 12, the wheel is turned in a counterclockwise direction (as viewed in FIG. 2). Because pawl 54 prevents ratchet wheel 76 from rotating with the shaft, initially driver 78 is rotationally locked to ratchet wheel 76. Thus, the interaction of shaft threads 102 and driver threads 116 causes the driver to move axially to the left (as viewed in FIG. 3) reducing the friction between driver flange 110 and clutch plate 74. Once the friction is sufficiently reduced, the force applied to driver 78 by the vehicle brake through gear 16, pinion 84 and coupler 82 causes drive member 78 to rotate in the same direction as shaft 70 relative to ratchet wheel 76.

As long as wheel 12 is rotated in the counterclockwise direction (as viewed in FIG. 2), the brake will continue to be released. However, if wheel 12 is held stationary, gear 16 will continue to rotate over a short distance. That is, the rotational force exerted on gear 16 through chain 208 by the vehicle brake will cause gear 16 to continue to rotate in the clockwise direction (as viewed in FIG. 2). Since shaft 70 is stationary, the counterforce on gear 16 will cause the pinion, coupler and driver to continue to rotate until the driver moves axially to the right (as viewed in FIG. 2) causing the clutch plates to once again rotationally fix driver 78 and ratchet wheel 76 to shaft flange 108. Therefore, in order to release the brake, the hand wheel must be rotated several times in the counter clockwise direction before the brake is considered fully released.

In one embodiment of the invention, pin 104 extending from the shaft 70 is provided to engage with stop wall 114 on driver 78 (FIG. 5) to prevent the driver from reaching the end of shaft threaded portion 102 as wheel 12 is rotate counterclockwise. Preferably, as wheel 12 is rotated counterclockwise and driver 78 moves axially to the left (with respect to FIG. 3), release pin 104 will engage stop wall 114 before the driver reaches the end of the threads to prevent the driver from jamming the coupler against the pinion. After pin 104 engages stop wall 114 the driver is rotationally coupled to shaft 70, and continued counterclockwise rotation of the wheel causes rotation of driver 78, coupler 82 and pinion 84, thereby further releasing the vehicle brake.

Figure 7A:
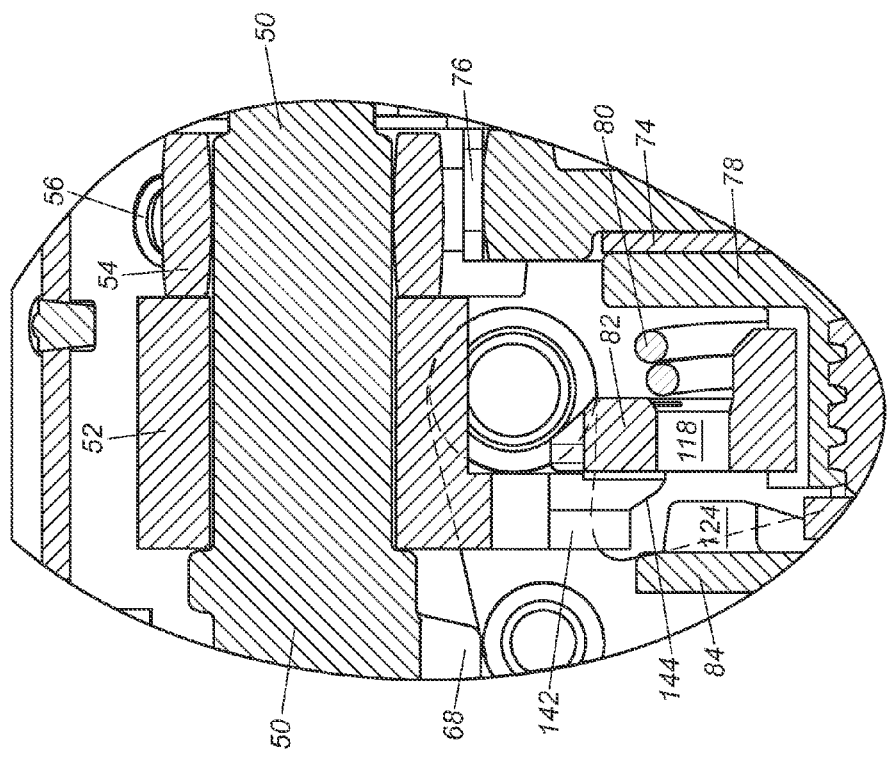
FIGS. 7A and 7B are partial cutaway views of the quick release mechanism used in the hand brake of FIG. 2.
Figure 7B:
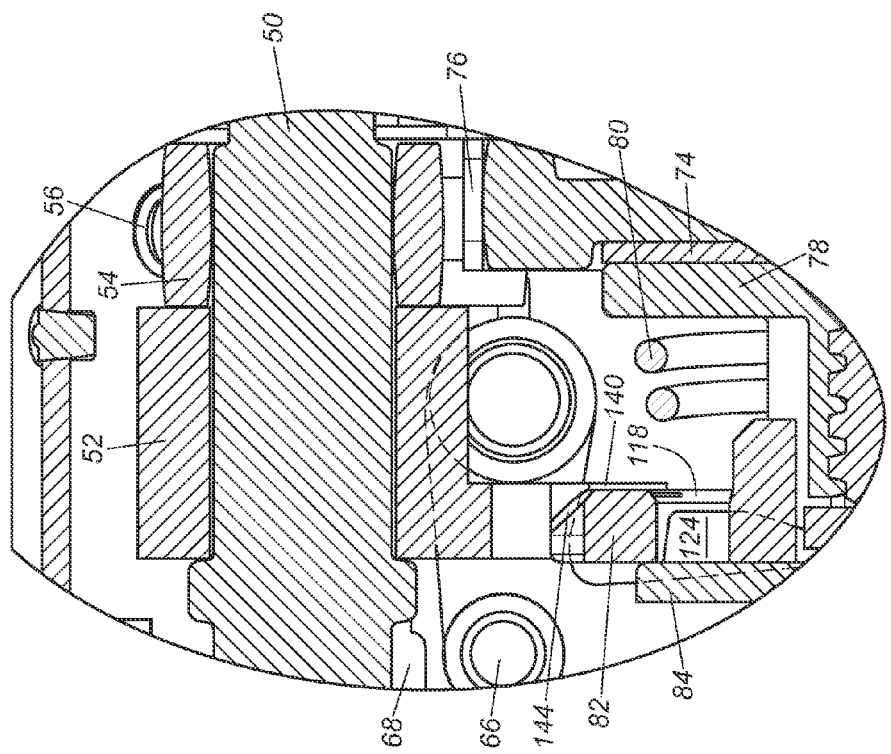

In addition to releasing the brake by rotating wheel 12, the brake may also be released by operation of quick release lever 22 without rotating wheel 12. In particular, and referring to FIGS. 2 and 8A, handle 22 is rotationally fixed on shaft 50 as previously discussed above. Thus, as handle 22 (FIG. 2) is lifted upward, shaft 50 (FIG. 2) rotates clockwise (with respect to FIGS. 8A and 8B) causing cam 68 to engage bell crank 58. That is, arms 138 of bell crank 58 pivot about pins 64 and 66 (FIGS. 3, 4, 7A and 7B) downward against the rear surface of coupler 82. As a result, and referring to FIGS. 7A and 7B, bell crank arms 138 force coupler 82 axially to the right (with respect to FIGS. 7A and 7B) apart from pinion drive dogs 124 into the position shown in FIG. 7B. Because the pinion is rotatably mounted on shaft 70, the counterforce exerted on gear 16 by chain 208 causes pinion 84 to rotate freely in the counterclockwise direction allowing the brake on the vehicle to release. This occurs without rotation of wheel 12 since the pinion is not rotationally coupled to shaft 70 when quick release handle 22 is lifted. Opposite movement of quick release lever 22 moves bell crank arms from against coupler 82 and the force of spring 80 moves the coupler 82 axially rearward into engagement with pawl 52 so that the pawl retains the coupler in a sustained disengaged position.

Referring to FIGS. 9-11, the last method of releasing the hand brake is through actuation of quick release mechanism. The quick release mechanism consists of an air cylinder 13 mounted to brake housing 28 (FIGS. 2-4). Air cylinder 13 contains a moveable rod 71A having an exposed U-shaped first end 73. A first end 75A of a lever arm 75 is pivotally coupled to moveable rod U-shaped first end 73 by a pin 73A. An opposite second end 75B of lever arm 75 is coupled to a bracket 77 by a shoulder bolt 79. In one embodiment, bracket 77 is coupled to brake housing 28. Lever arm second end 75B is operatively in contact with bell crank 58. In operation, a control device (not shown) on the railway car sends a signal to an air solenoid control valve (not shown), which causes the valve to open and allow air to flow into air cylinder input port 15 (FIG. 2). The airflow fills cylinder 13 causing moveable rod 71A to move upward (with respect to FIGS. 9-11). As rod 71A moves upward (FIG. 10), lever arm 75 pivots about shoulder bolt 79 thereby causing lever arm second end 75B to move bell crank 58 downward into contact with coupler 82. Continued downward movement of bell crank 58 causes coupler 82 to move axially to the right (with respect to FIGS. 7A and 7B) apart from pinion drive dogs 124 into the position shown in FIG. 7B. Because the pinion is rotatably mounted on shaft 70, the counterforce exerted on gear 16 by chain 208 causes pinion 84 to rotate freely in the counterclockwise direction allowing the brake on the vehicle to release. This occurs without rotation of wheel 12 since the pinion is not rotationally coupled to shaft 70. When the airflow is discontinued, rod 71A will retract back into cylinder 13 thereby causing lever arm 75 to rotate counterclockwise about shoulder bolt 79. Bell crank 58 moves out of contact from against coupler 82 and the force of spring 80 moves the coupler 82 into engagement with sustained release pawl 52 so that the coupler is maintained in a disengaged position with respect to the pinion. The brake can then be released from the sustained position as explained below.

Figure 8B:
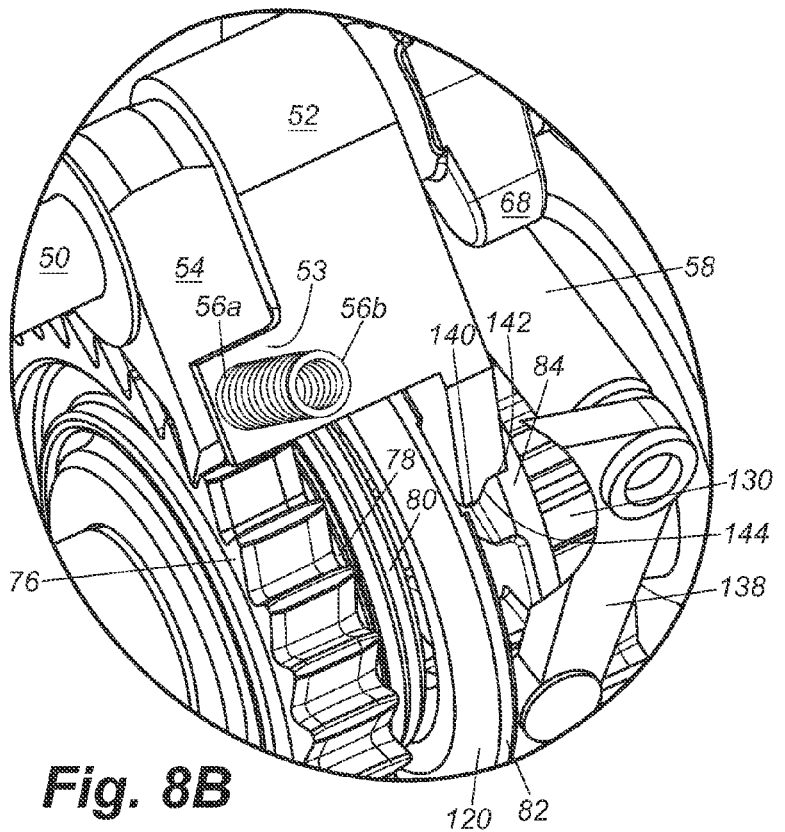

As pointed out in the background, it is advantageous for the operator to deactivate the brake mechanism quickly, especially in a situation where many vehicle brakes must be deactivated in a relatively short time period. Thus, in order to reduce the time the operator must maintain the release handle in the released position, the present invention uses sustained release pawl 52 (FIG. 8A) to maintain the coupler in the released position after quick release handle 22 or rod 71A returns downward into their normal operating state. As previously described above with reference to FIG. 4, sustained release pawl 52 and pawl 54 are rotatably received on shaft 50. Sustained release pawl portion 53 extends over an end of pawl 54 so that upward movement of pawl 54 over the ratchet wheel teeth causes pawl 52 to also rotate about shaft 50 outward from its resting position. Sustained release pawl 54 generally may be located in one of two positions: the first between driver 78 and coupler 82 (FIG. 8A) and the second between coupler 82 and pinion 84 (FIG. 8B).

Referring to FIG. 8A, sustained release pawl 52 has a first flat edge 140, a second flat edge 142 and an angled portion 144 that connects the two flat edges. Angled portion 144 is sized and shaped to correspond to the angled front surface 120 formed on coupler 82. Thus, during normal operation of brake mechanism 10, pawl 52 is positioned intermediate coupler 82 and driver 78 adjacent to the coupler. As wheel 12 is turned in the clockwise direction to activate the vehicle brake and once the clutch plates rotationally lock ratchet wheel 76 to shaft 70, ratchet wheel 76 turns in the clockwise direction in conjunction with shaft 70 causing pawl 54 to ride over the ratchet wheel teeth. This in turn also causes sustained release pawl 52 to move radially outward against the inward bias of spring 56 so that spring 56 biases pawl 54 back into operative engagement with the ratchet wheel teeth vis-a-vis sustained release pawl portion 53.

If, however, quick release handle 22 or rod 71A is lifted to release the vehicle brake, then bell crank arms rotate downward into engagement with coupler 82 thereby forcing the coupler axially to the left (with respect to FIG. 8A). Consequently, as coupler 82 moves axially to the left, coupler angled surface 120 presses against angled pawl portion 144 causing the pawl to be forced radially outward so that the pawl can ride over coupler surface 120 into its second position, shown in FIG. 8B. Referring to FIG. 8B, sustained release pawl 52 is now positioned intermediate coupler 82 and pinion 84 and spring 56 urges the pawl radially downward into this position. Consequently, if quick release handle 22 or rod 71A are allowed to return to their disengaged state such that cam 68 allows bell crank arms 58 to move out of engagement with coupler 82, spring 80 will once again force coupler 82 axially to the right (with respect to FIG. 8B). However, coupler 82 will only move axially to the right a very short distance since sustained release pawl 52 is positioned between coupler 82 and pinion 84. Sustained release pawl 52 therefore maintains the brake mechanism in the quick released state. Furthermore, should the vehicle brake stick in the braking position due to rust that forms when the brake is engaged for a period of time, it can always break free once the vehicle is moved since the braking mechanism is maintained in the quick release position where the coupler is disengaged from the pinion.

To release the sustained release pawl to its first (FIG. 8A) position so that the vehicle brake may be reengaged, the user first ensures that quick release handle 22 or rod 71A are disengaged and then begins to rotate wheel 12 clockwise (with respect to FIG. 2). As wheel 12 is rotated clockwise, driver 78 moves axially to the right (with respect to FIG. 3) along shaft threads 102 until clutch plates 72 and 74 rotationally fix ratchet wheel 76 to shaft 70, at which time ratchet wheel 76 rotates in conjunction with shaft 70. As the ratchet wheel rotates with the shaft, pawl 54 is forced radially outward against the radially inward bias of spring 56 through sustained release pawl portion 53 so that pawl 54 ratchets over the ratchet wheel teeth. As previously discussed, as pawl 54 ratchets over the teeth, pawl 54 also causes pawl 52 to move radially outward because of the coupling between the pawls such that sustained release pawl 52 moves out from between coupler 82 and pinion 84. Once sustained release pawl moves radially outward, spring 80 urges the coupler axially to the left (with respect to FIG. 3) from the position shown in FIG. 8B into engagement with pinion 84, and pawl 52 returns to the position illustrated in FIG. 8A between driver 78 and coupler 82. Once in this position, the operation of brake mechanism 10 operates similar to that described above.

Figure 22:
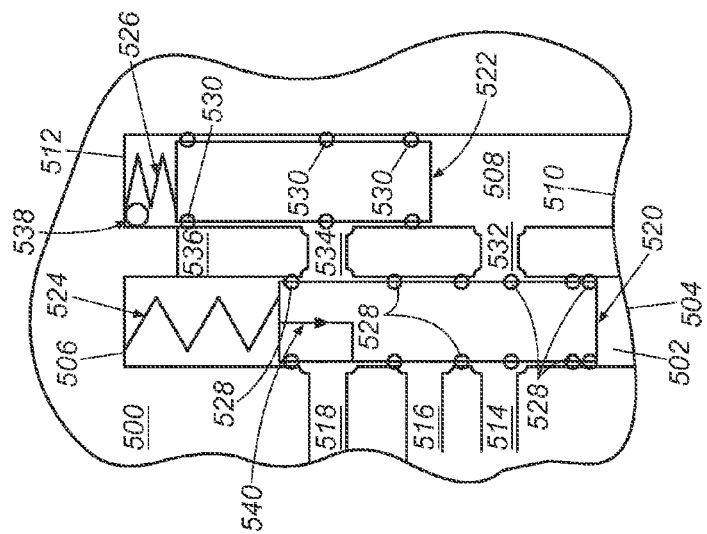
FIG. 22 is an embodiment of a control valve for use with the hand brake of FIG. 2, where the spools are in an initial position.
Figure 23:
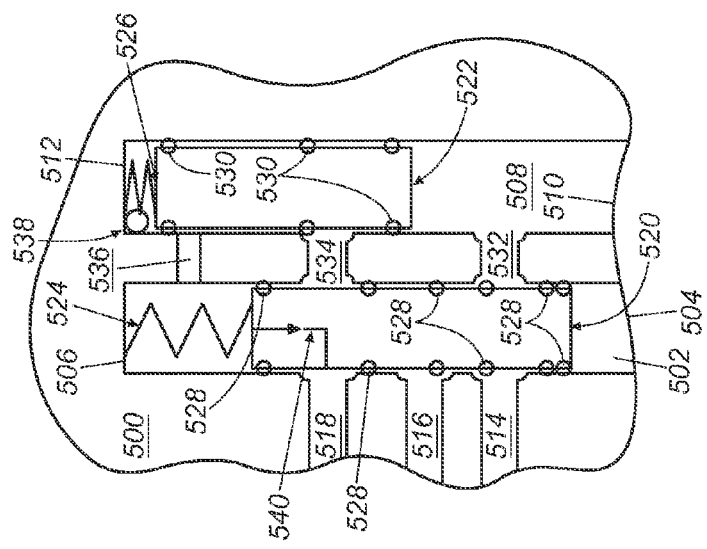
FIG. 23 is a plan view of the control valve of FIG. 22 in a second position where the spools are in a second position that activates the hand brake.
Figure 24:
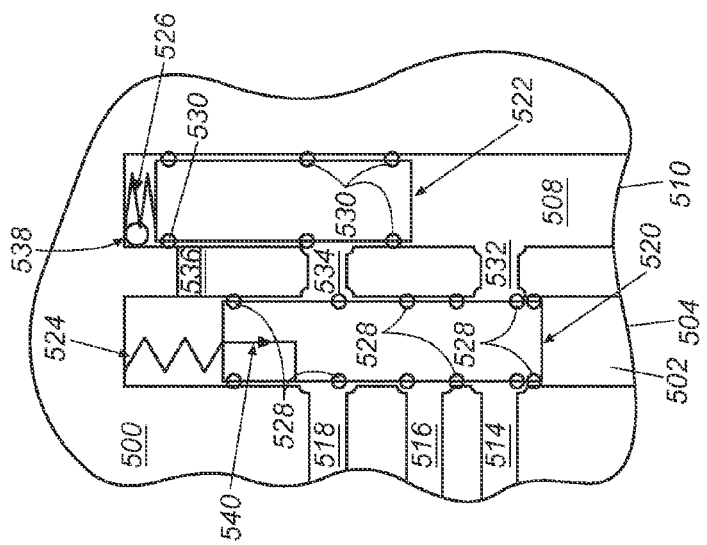
FIG. 24 is a plan view of the control valve of FIG. 22 in a third position where the spools are in a position to prevent activation of the hand brake.

FIGS. 22-24 illustrate a control valve for use with hand brake 12 in controlling the automated release of the handbrake mechanism. The control valve has a body 500, a first elongated bore 502 and a second elongated bore 508. First bore 502 has first end 504 and an opposite second end 506. Second elongated bore 508 has a first end 510 and a second end 512. A first spool 520 is slideably received in first bore 502, and a second spool 522 is slideably received in second bore 508. A first spring 524 is positioned intermediate one end of spool 520 and first bore second end 506, and a second spring 526 is positioned intermediate one end of spool 522 and second bore second end 512. First spool 520 receives a plurality of seals 528 in grooves (not numbered) formed in an outer circumferential surface of the spool. Second spool 522 receives a plurality of seals 530 in grooves (not numbered) formed in an outer circumferential surface of the spool. Seals 528 and 530 prevent air pressure from moving from one side of the seal to the other, thereby creating a plurality of air pockets along the length of first and second spools 520 and 522 in between the seals.

Body 500 defines a plurality of ports: some input, some output and some both input/output. In particular, a first input port 514 is in fluid communication with a brake pipe air supply (not shown). A first output port 516 is in fluid communication with hand brake cylinder input port 15 (FIG. 2). Brake pipe air enters through first input port 514, fills the area around first spool 520 between the seals, as shown in FIG. 22. Brake pipe air also fills the bottom portion of second bore 508 as it passes through opening 532. Brake pipe air enters first bore 502 via first end 504. As brake pipe pressure increases slightly, for example to 5 psi, second spool 522 moves upward against the downward bias of second spring 526 closing off port 536 (FIG. 23). As brake pipe pressure increases, for example to 60 psi, first spool 520 moves slightly upward against the downward bias of first spring 524 opening first output port 516 into fluid communication with first input port 514 (FIG. 23). A stop (not shown) formed in second bore 508 prevents further upward travel of second spool 522 in second bore 508.

In this position, brake pipe pressure flows from port 514 thru output port 516, which is in fluid communication with hand brake air cylinder 13 (FIG. 2). As first spool 520 moves upward, any air trapped above first spool 520, proximate first bore second end 506, is exhausted via check valve 540 and dispersed through second output port 518, which is connected to the atmosphere. A third port 538 exhausts any air located above second spool 522 to atmosphere. Thus, when the input pressure is sufficient, first and second spools 520 and 522 are pushed upward so that input air on port 514 flows out of port 516 into the handbrake cylinder.

As brake pipe pressure increases, for example to 70 psi, first spool 520 is pushed further upward against the downward bias of first spring 524 thereby closing off first output port 516 from first input port 514 (FIG. 24). That is, the third seal from the bottom of the spool provides an airtight seal and prevents any air flowing between first bore 502 and output port 516. Instead, first output port 516 is in fluid communication with second output port 518, and air from hand brake air cylinder 13 is released to the atmosphere.

If brake pipe pressure increases above a predetermined threshold, both first spool 520 and second spool 522 are prevented from further movement upward respectively toward first bore second end 506 and second bore second end 512 due to built in stops (not shown) formed in the bores. Once the brake pipe pressure decreases, first spool 520 is locked into position because no air is allowed to migrate above the spool. Second pool 522, however, is allowed to move downward because air can be drawn in from the atmosphere through port 538. However, second spool 522 will not move downward until the brake pipe pressure is reduced to a predetermined pressure, for example 5 psi.

At this point, movement of second spool 522 to the position shown in FIG. 22 opens port 536, which places the space between first spool 520 and first bore second end 506 in fluid communication with the atmosphere through port 538 thereby allowing first spool 520 to move downward. It should be understood from the above description that second spool 522 is used to lock first spool 520 so hand brake release mechanism 13 is never charged except for when the train is initially charging the brake pipe.

Figure 12:
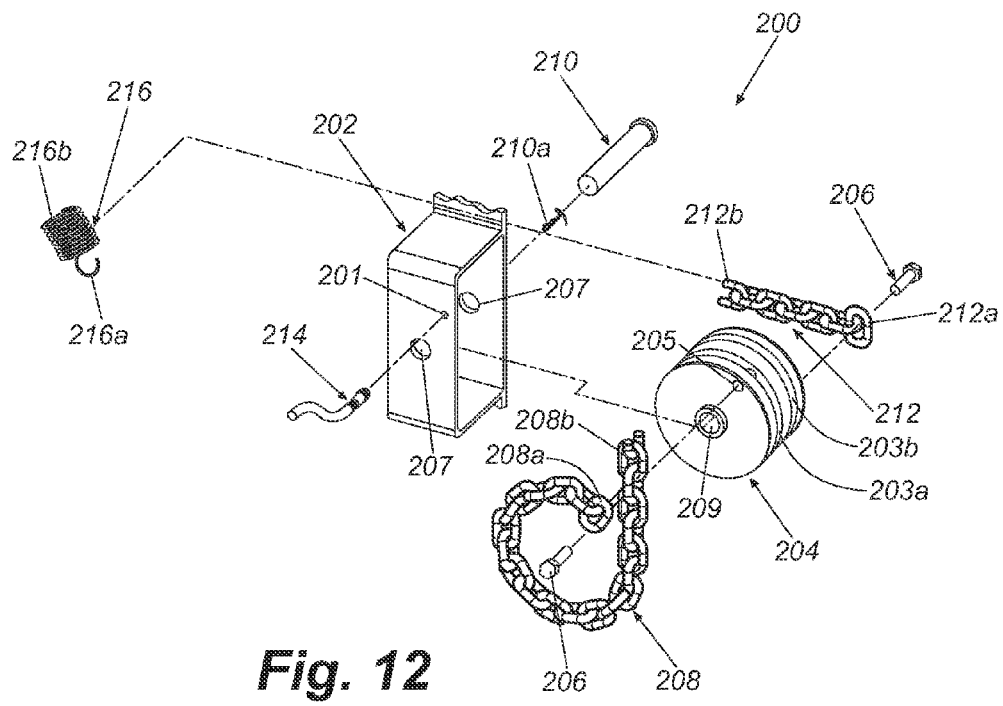
FIG. 12 is an exploded perspective view of an embodiment of a pulley system for use in a freight car brake system with the hand brake of FIG. 2.

Referring to FIG. 12, the present invention provides an improved pulley system 200 that is positioned intermediate handbrake 12 (FIG. 2) and handbrake lever 26 (FIG. 1). Pulley system 200 is shown having a frame 202 and a wheel 204 having a first groove 203*a* and a second groove 203*b*. Frame 202 defines two through-holes 207 that are adapted to receive a shaft 210. Frame 202 also defines a third through hole 201 that is adapted to receive a control arm sensor 214. Wheel 204 contains a bore 209 that is adapted to fit about shaft 210. In this way, wheel 204 rotates about shaft 210 in both a first direction and an opposite second direction. Control sensor 214, at one end connects to a car control device (not shown) and at the opposite end is configured to sense the position of wheel 204. Control sensor 214 may be a proximity sensor or switch sensor that senses the position of wheel 204 to determine if the wheel is in a first released position or a second set position with respect to the brake rigging. In one embodiment, sensor 214 senses a position of a fastener 206 used to attach a first chain 208 to wheel 204. One of skill in the art should understand that sensor 214 may be configured to sense any other feature of wheel 204 to determine the position of hand brake 12.

Wheel first groove 203*a* receives a first end 208*a* of a first chain 208, which is fixed to the wheel by a fastener 206. A hand brake (not shown) is operatively coupled to an opposite second end 208*b* of chain 208. Wheel second groove 203*b* receives a first end 212*a* of a second chain 212, which is fixed to the wheel by a second fastener 206. Fasteners 206 may be any suitable fastener such as a threaded bolt, pin, etc. A brake rigging (not shown) is operatively coupled to an opposite second end 212*b* of second chain 212. A spring 216 is operatively coupled at a first end 216*a* to second chain second end 212*b* and to the frame of the railway car at a second end 216*b*.

Figure 13:
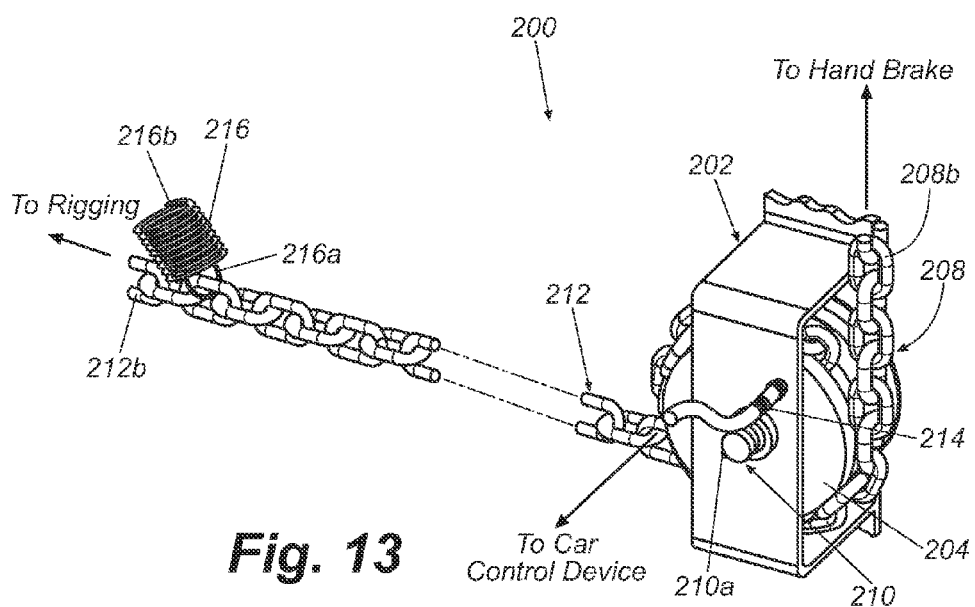
FIG. 13 is a perspective view of the pulley system of FIG. 12 with the hand brake in the fully released position.

Referring to FIG. 13, improved pulley system 200 is shown in the first released position where hand brake chain 208 is wrapped around wheel first groove 203*a* (FIG. 12) and only a small portion of second chain first end 212*a* is received in wheel second groove 203*b*. Spring 216 is in its rest position and provides tension on second chain 212 to keep the second chain tight. In this position, sensor 214 senses the position of wheel 204 and transmits a signal to the railway car control device that indicates the railway car brakes are in the released position. If the railway car control device does not sense that the railway car brakes are in the released position, a signal may be sent to air cylinder 13 (FIG. 2) that causes the handbrake to release, as described with respect to FIGS. 9-11.

Referring to FIG. 14, when the hand brake is applied, first chain 208 is pulled by handbrake 12 (FIG. 2) causing wheel 204 to rotate in the counterclockwise direction with respect to frame 202. By this rotation, first chain 208 is pulled from wheel first groove 203*a*, and second chain 212 is caused to wrap around wheel 204 in wheel second groove 203*b*. As second chain 212 wraps around wheel 204, spring 216 is under tension and exerts a tension force on second chain 212 in a general direction away from wheel 204, and the railway car brakes engage with the wheels (not shown). When the handbrake is released, the tension force exerted by spring 216 on second chain 212 will cause wheel 204 to rotated clockwise thereby wrapping first chain 208 around wheel 204 in first wheel groove 203*a*.

Referring to FIGS. 15 and 16, another embodiment of the present invention provides an improved pulley system 300 positioned intermediate handbrake 12 (FIG. 2) and handbrake lever 26 (FIG. 1). A pulley system 300 has a frame 302 and a wheel 304 having a first groove 303*a* and a second groove 303*b* (FIGS. 15 and 16). Frame 302 defines two through-holes 307 that are adapted to receive a shaft 310. Frame 302 also defines a third through hole 301 that is adapted to receive a control arm sensor 314. Wheel 304 contains a bore 309 that is adapted to fit about shaft 310. In this way, wheel 304 rotates about shaft 310 in both a first direction and an opposite second direction. Bore 309 defines a first slot 326 and a receiving chamber 324 configured to receive a torsion spring 316. One end 322 of torsion spring 316 is received in slot 326 thereby rotationally fixing one end of the spring to wheel 304. A second end 320 of spring 316 is operatively coupled to frame 302 so that wheel 304 is biased toward a released position, as further discussed below.

Control sensor 314, at one end connects to a car control device (not shown) and at the opposite end is configured to sense the position of wheel 304. Control sensor 314 may be a proximity sensor or switch sensor that senses the position of wheel 304 to determine if the wheel is in a first released position or a second set position with respect to the brake rigging. In one embodiment, sensor 314 senses a position of a fastener 306 used to attach a first chain 308 to wheel 304. One of skill in the art should understand that sensor 314 may be configured to sense any other feature of wheel 304.

Wheel first groove 303*a* receives a first end 308*a* of a first chain 308, which is fixed to the wheel by a fastener 306. A hand brake (not shown) is operatively coupled to an opposite second end 308*b* of first chain 308. Wheel second groove 303*b* receives a first end 312*a* of a second chain 312, which is fixed to the wheel by a second fastener 306. Fasteners 306 may be any suitable fastener such as a threaded bolt, pin, etc. A brake rigging (not shown) is operatively coupled to an opposite second end 312*b* of second chain 312.

Figure 17:
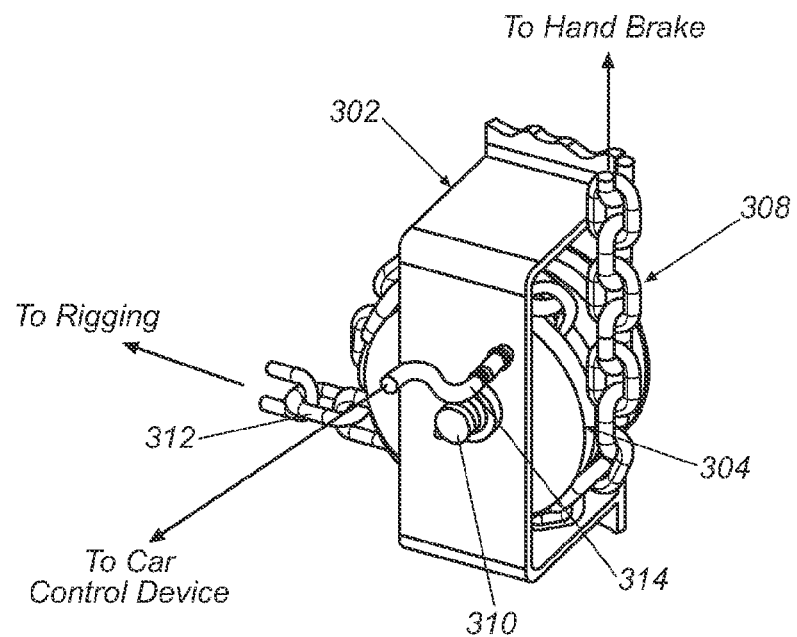
FIG. 17 is a perspective view of the pulley system of FIG. 15 with the hand brake in the fully released position.

Referring to FIG. 17, improved pulley system 300 is shown in the first released position where hand brake chain 308 is wrapped around wheel first groove 303*a* (FIG. 15) and only a small portion of second chain first end 312*a* is received in wheel second groove 303*b*. Spring 316 is in its rest position and provides tension on second chain 312 to keep the second chain tight. In this position, sensor 314 senses the position of wheel 304 and transmits a signal to the railway car control device that indicates the railway car brakes are in the released position. If the railway car control device does not sense that the railway car brakes are in the released position, a signal may be sent to automated release air cylinder 13 (FIG. 2) that causes the handbrake to release, as described above with reference to FIGS. 9-11.

Figure 18:
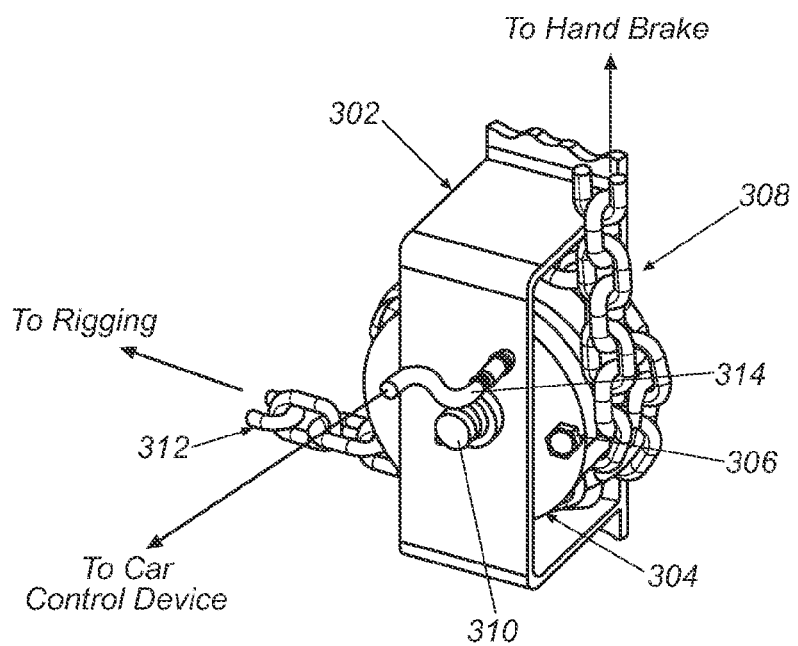
FIG. 18 is a perspective view of the sheave of FIG. 15 with the hand brake in the fully applied position.

Referring to FIG. 18, when the hand brake is applied, first chain 308 is pulled by handbrake 12 causing wheel 304 to rotate in the counterclockwise direction with respect to frame 302. By this rotation, first chain 308 is pulled from wheel first groove 303a, and second chain 312 is caused to wrap around wheel 304 in wheel second groove 303b. As second chain 312 wraps around wheel 304, spring ends 320 and 322 are urged toward each other placing spring 316 under compression, and the railway car brakes engage with the wheels (not shown). In this position, spring 316 biases wheel 304 in the clockwise direction. When the handbrake is released, the spring force exerted by spring 316 causes wheel 304 to rotated clockwise thereby wrapping first chain 308 around wheel 304 in first wheel groove 303A.

Sensor 314 may operate in various configurations. For example, sensor 314 may become active only after the car control device receives an input signal indicating that the handbrake has been released. Thus, sensor 314 would provide a signal to the car control device when it detects that the brakes are in the fully released position. In the alternative, once the sensor is active, sensor 314 may only send a signal to the car control device if it detects that the brakes are more than half way to the fully applied position.

One advantage of the above described power pulley systems is that the pulley is biased in the clockwise direction to ensure that chain 212 or 312 is allowed to move to the left (with respect to FIG. 1) to ensure that sufficient slack is present to allow the brake assembly to release. Moreover, the above described systems not only detect when the brake system is not fully released, but also provide a signal to the railcar control device that actuates an automated quick release mechanism to ensure that the brake released.

In some embodiments, the mechanical advantage of the improved power pulley system may be improved by varying the outside diameter of wheel 204 or 304 proximate each chain groove. For example, if wheel groove 203b has a smaller outside diameter as compared to wheel groove 203a, then a mechanical advantage is provided. In another embodiment, the outside diameter of wheel 204 or 304 could be adjusted to allow for a predetermined chain travel.

Figure 21:
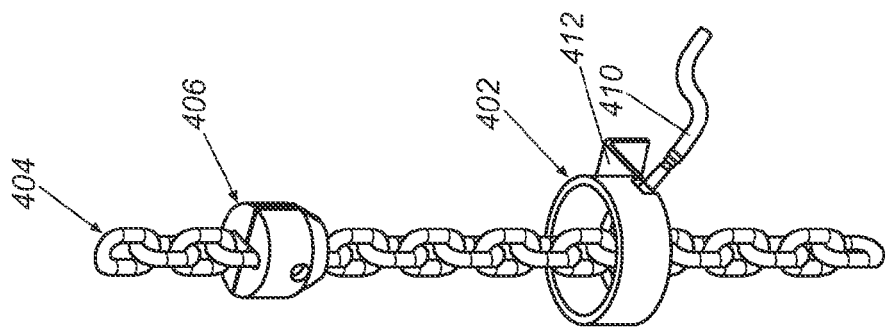
FIG. 21 is a perspective view of the chain locator of FIG. 19.
Figure 20:
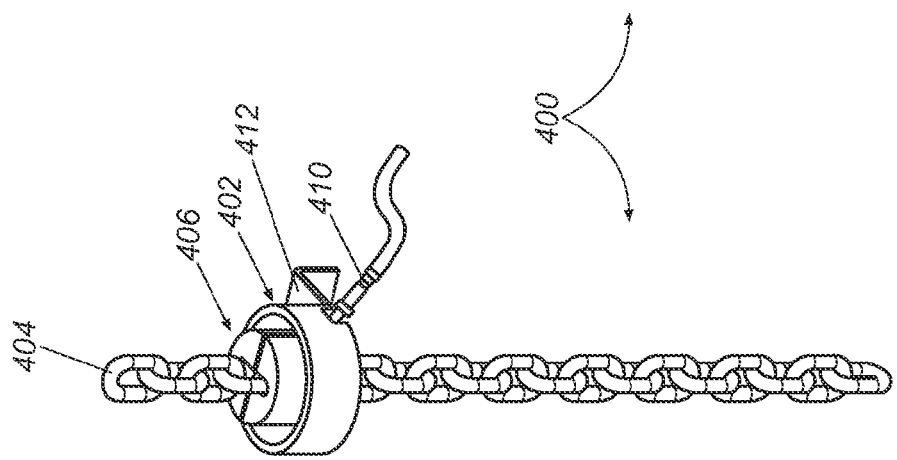
FIG. 20 is a perspective view of the chain locator of FIG. 19.
Figure 19:
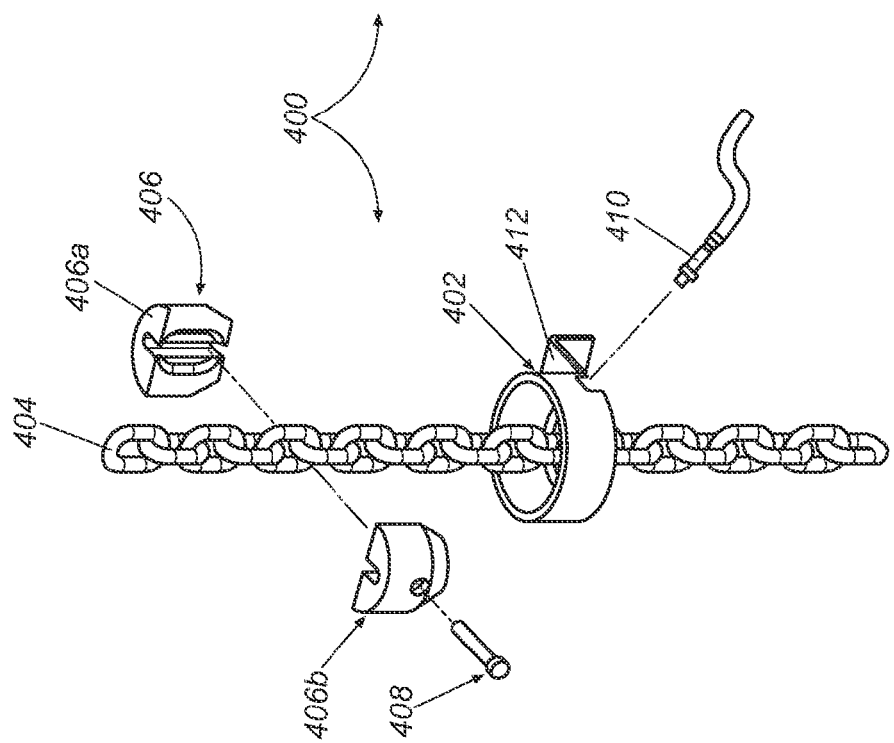
FIG. 19 is an exploded perspective view of a chain locator for use with the hand brake of FIG. 2 and/or the pulley systems of FIGS. 12 and 15.

Referring to FIGS. 19-21, in some embodiments a chain locator may be used to detect the position of handbrake 12. In particular, a frame 402, defining a through hole (not numbered), a bracket flange 412 and a sensor holder (not numbered), receives a chain 404, which may correspond to chains 208 or 308. Frame 402 may be coupled to a portion of the railway car between the handbrake and the brake assembly.

Preferably, frame 402 is positioned intermediate handbrake 12 (FIG. 2) and one of pulley systems 200 or 300. A stop block 406, formed from a first half 406a and a second half 406b, is axially fixed to chain 404 by a fastener 408. Fastener 408 may be any type of suitable fastener such as a bolt, a pin, etc. Stop block 406 may be made of any suitable material, for example elastomers, polymers, ceramics, metals, etc. The key to stop block 406 is that it is formed from a suitable material that can be detected by a sensor 410 that is received in the frame sensor holder 402. Sensor 410 may be a switch type sensor, a proximity sensor or any other suitable sensor that can detect the presence of stop block 406.

Referring specifically to FIG. 20, stop block 406 is seated in frame 402 when hand brake 12 is in the fully released position. That is, as chain 208 is released from hand brake 12, stop block 406 moves from the position shown in FIG. 21 into the position shown in FIG. 20. In this position, sensor 410 detects the presence of stop block 406 and sends a signal to the railway car control device to indicate that the handbrake is fully released.

Referring to FIG. 21, when the handbrake is applied, chain 404 is moved upward thereby moving stop block 406 out of frame 402. In this position, sensor 410 will not detect the stop block. It should be understood that sensor 410 may provide a signal either if stop block 406 is in frame 402 or out of frame 402 away from sensor 410. In either case, the signal generated by sensor 410 can be used to inform the railway car control device of the position of handbrake 12. That is, the signal can be used to indicate if the brake assembly is in the released or applied position. For example, if handbrake 12 is manually released but chain 208 or 308 does not move down through frame 402 so that stop block 406 is seated in frame 402, the railway car control device may automatically cause hand brake 12 to release, based on the signal received from sensor 410, to ensure that the brake assembly is in the released position.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What we claim:

1. A brake mechanism for connecting to the brake rigging of a railway car, said brake mechanism comprising:
   a. a housing;
   b. a first handle;
   c. a first shaft mounted in said housing and coupled to said first handle, said first shaft having at least one gear rotatably received thereon;
   d. a second gear rotatably mounted in said housing in operative engagement with said first shaft;
   e. a locking mechanism mounted in said housing and in operative engagement with said first shaft at least one gear, said locking mechanism comprising
      (i) a second shaft mounted in said housing,
      (ii) a first pawl rotatably received on said second shaft and in operative engagement with said first shaft at least one gear,
      (iii) a second pawl having a first portion and a second portion, said first portion being in operative engagement with said first pawl, and
   f. a clutch operatively disposed between said first handle and said second gear, said clutch being in operative engagement with said second pawl second portion, wherein said clutch is moveable between
      a first position in which said first shaft is rotationally coupled to said first and said second gears, and
      a second position in which said second gear rotates with respect to said first shaft;
   g. a remotely operated quick release mechanism operatively coupled to said housing, said remotely operated quick release mechanism having a first end operatively coupled to a power source and an opposite second end operatively coupled to said clutch so as to move said clutch from said clutch first position into said clutch second position, said opposite second end including a lever having a first end and a second end, said lever being connected to said housing at a pivot point disposed between said lever first and second ends; and h. a bell crank mounted in said housing intermediate said clutch and said remotely operated quick release mechanism,
    wherein said lever second end is in sliding engagement with said bell crank such that said lever second end slides along a portion of said bell crank as said clutch is moved from said first position into said second position.

2. The brake mechanism of claim 1, wherein
when said remotely operated quick release mechanism is actuated, said bell crank is engaged with said clutch to move said clutch to said second position, and
said second pawl second portion releasably retains said clutch in said second position.

3. The brake mechanism of claim 2, said quick release mechanism further comprising an air cylinder having an input port and a moveable rod, wherein,
    a. said input port is coupled to said power source, and
    b. said moveable rod is operatively coupled to said clutch by said lever and said bell crank.

4. The brake mechanism of claim 3, wherein said power supply is a source of compressed air.

5. The brake mechanism of claim 4, further comprising an air solenoid control valve intermediate said compressed air source and said air cylinder for controlling the flow of air into said air cylinder.

6. The brake mechanism of claim 3, said clutch further comprising:
    a. a driver;
    b. at least one clutch plate disposed between said driver and said first shaft at least one gear;
    c. a pinion gear axially fixed and rotatably received on said first shaft,
    d. a coupler positioned intermediate said pinion gear and said driver, said coupler being rotationally fixed and axially moveable with respect to said driver, said coupler rotationally fixing said pinion gear to said driver in said clutch first position and disengaging said pinion gear from said first shaft in said clutch second position; and
    e. a spring disposed between said coupler and said driver to bias said coupler into engagement with said pinion gear.

7. The brake mechanism of claim 6,
    a. said pinion gear comprising a plurality of drive dogs located proximate said coupler; and
    b. said coupler defining a plurality of openings spaced about said coupler, wherein a respective one of said plurality of drive dog engages a corresponding one of said plurality of openings to rotationally couple said pinion gear to said coupler.

8. The brake mechanism of claim 3, further comprising a chain coupled between said second gear and the railway car brake rigging.

9. A quick release brake mechanism for use on a railway car, said brake mechanism comprising:
    a. a housing;
    b. a first shaft mounted in said housing and having at least one gear rotatably received thereon;
    c. a second gear rotatably mounted in said housing in operative engagement with said first shaft;
    d. a clutch operatively disposed between said first shaft and said second gear,
    e. a locking mechanism mounted in said housing and in operative engagement with said first shaft at least one gear and said clutch, wherein said clutch is moveable between
        a first position in which said first shaft is rotationally coupled to said first and said second gears, and
        a second position in which said second gear rotates with respect to said first shaft;
    f. a remotely operated quick release mechanism operatively coupled to said housing, said remotely operated quick release mechanism having a first end operatively coupled to a power source and an opposite second end operatively coupled to said clutch so as to move said clutch from said clutch first position into said clutch second position, said opposite second end including a lever having a first end and a second end, said lever being connected to said housing at a pivot point disposed between said lever first and second ends; and
    g. a bell crank mounted in said housing intermediate said clutch and said remotely operated quick release mechanism,
        wherein said lever second end is in sliding engagement with said bell crank such that said lever second end slides along a portion of said bell crank as said clutch is moved from said first position into said second position.

10. The brake mechanism of claim 9, said quick release mechanism further comprising an air cylinder having an input port and a moveable rod, wherein,
    a. said input port is coupled to said power source, and
    b. said moveable rod is operatively coupled to said clutch by said lever.

11. The brake mechanism of claim 10, wherein said power supply is a source of compressed air.

12. The brake mechanism of claim 11, further comprising an air solenoid control valve intermediate said compressed air source and said air cylinder for controlling the flow of air into said air cylinder.

13. The brake mechanism of claim 9, said locking mechanism comprising:
    a. a second shaft mounted in said housing,
    b. a first pawl rotatably received on said second shaft and in operative engagement with said first shaft at least one gear,
    c. a second pawl having a first portion and a second portion, said first portion being in operative engagement with said first pawl and said second portion being in operative engagement with said clutch.

14. A method for releasing a railway brake remotely from the railway car, said method comprising the steps of:
    a. providing a brake mechanism for connecting to the brake rigging of a railway car, said brake mechanism comprising:
        (i) a housing;
        (ii) a first shaft mounted in said housing and having at least one gear rotatably received thereon;
        (iii) a second gear rotatably mounted in said housing in operative engagement with said first shaft;
        (iv) a clutch operatively disposed between said first shaft and said second gear;
        (v) a locking mechanism mounted in said housing and in operative engagement with said first shaft at least one gear and said clutch, wherein said clutch is moveable between
            a first position in which said first shaft is rotationally coupled to said first and said second gears, and
            a second position in which said second gear rotates with respect to said first shaft;
        (vi) a remotely operated quick release mechanism having a first end operatively coupled to a compressed air source and an opposite second end operatively coupled to said clutch, said opposite second end including a lever having a first end and a second end, said lever being connected to said housing at a pivot point disposed between said lever first and second ends; and (vii) a bell crank mounted in said housing intermediate said clutch and said remotely operated quick release mechanism, and b. actuating said quick release mechanism from a remote location so that said lever second end slides along a portion of said bell crank such that said clutch is moved from said first position into said second position.

15. The method for releasing a railway brake remotely from the railway car of claim 14, further comprising the step of maintaining said clutch in said second position using said locking mechanism.

16. The method for releasing a railway brake remotely from the railway car of claim 14, wherein said remote operated quick release mechanism further comprises an air cylinder having a moveable rod, wherein said moveable rod is operatively coupled to said clutch and said air cylinder is operatively coupled to said housing.

17. The method for releasing a railway brake remotely from the railway car of claim 14, said locking mechanism comprising:
 a. a second shaft mounted in said housing,
 b. a first pawl rotatably received on said second shaft and in operative engagement with said first shaft at least one gear,
 c. a second pawl having a first portion and a second portion, said first portion being in operative engagement with said first pawl and said second portion being in operative engagement with said clutch.

18. The method for releasing a railway brake remotely from the railway car of claim 14, further comprising a lever operatively coupled between said remote operated quick release mechanism second end and said clutch.

\* \* \* \* \*